US012394383B2

(12) United States Patent
Tsuchiya et al.

(10) Patent No.: US 12,394,383 B2
(45) Date of Patent: Aug. 19, 2025

(54) DISPLAY DEVICE

(71) Applicant: SONY GROUP CORPORATION, Tokyo (JP)

(72) Inventors: Haruki Tsuchiya, Tokyo (JP); Kei Kimura, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 18/718,455

(22) PCT Filed: Oct. 27, 2022

(86) PCT No.: PCT/JP2022/040060
§ 371 (c)(1),
(2) Date: Jun. 11, 2024

(87) PCT Pub. No.: WO2023/119861
PCT Pub. Date: Jun. 29, 2023

(65) Prior Publication Data

US 2025/0054449 A1 Feb. 13, 2025

(30) Foreign Application Priority Data

Dec. 20, 2021 (JP) ................................ 2021-206117

(51) Int. Cl.
*G09G 3/3258* (2016.01)
*G09F 9/30* (2006.01)
(Continued)

(52) U.S. Cl.
CPC ............ *G09G 3/3258* (2013.01); *G09F 9/30* (2013.01); *G09G 3/3233* (2013.01); (Continued)

(58) Field of Classification Search
CPC .. G09G 3/3258; G09G 3/3233; G09G 3/3696; G09G 3/3685; G09G 2310/027; (Continued)

(56) References Cited

U.S. PATENT DOCUMENTS 8,970,460 B2 * 3/2015 Yaguma .............. G09G 3/3696 345/87
2007/0080905 A1 * 4/2007 Takahara ............ G09G 3/3258 345/76
(Continued)

FOREIGN PATENT DOCUMENTS

JP 2006-243630 A 9/2006
JP 2011-095506 A 5/2011
(Continued)

OTHER PUBLICATIONS

International Search Report and Written Opinion of PCT Application No. PCT/JP2022/040060, issued on Jan. 10, 2023, 09 pages of ISRWO.

*Primary Examiner* — Tom V Sheng
(74) *Attorney, Agent, or Firm* — CHIP LAW GROUP

(57) ABSTRACT

To suppress a decrease in luminance. A display device includes: a plurality of pixels (10); a gradation voltage generation unit (40A, 40B) that generates a gradation voltage; a reference voltage supply wiring (611) at least partially extending in a pixel region (20) in which the plurality of pixels (10) is arranged, the reference voltage supply wiring (611) supplying a reference voltage to the pixels (10); and a lead-out wiring (70A, 70B) electrically connected to the reference voltage supply wiring (611) at a voltage lead-out position (Pv) on the reference voltage supply wiring (611), in which the gradation voltage generation unit (40A, 40B) generates the gradation voltage on the basis of the reference voltage supplied from the lead-out wiring (70A, 70B).

19 Claims, 37 Drawing Sheets

(51) Int. Cl.
*G09G 3/3233* (2016.01)
*G09G 3/36* (2006.01)

(52) U.S. Cl.
CPC ......... *G09G 3/3685* (2013.01); *G09G 3/3696* (2013.01); *G09G 2310/027* (2013.01); *G09G 2310/066* (2013.01); *G09G 2310/08* (2013.01)

(58) Field of Classification Search
CPC . G09G 2310/066; G09G 2310/08; G06F 9/30
USPC ........................................................... 345/76
See application file for complete search history.

(56) References Cited

U.S. PATENT DOCUMENTS

| | | | | |
|---|---|---|---|---|
| 2008/0111812 | A1* | 5/2008 | Shirasaki | G09G 3/3291 345/212 |
| 2009/0189924 | A1* | 7/2009 | Ogura | G09G 3/3233 345/690 |
| 2011/0007057 | A1* | 1/2011 | Fukuo | G09G 3/3614 345/87 |
| 2014/0085349 | A1* | 3/2014 | Shiibayashi | G09G 3/3614 345/690 |
| 2014/0267206 | A1* | 9/2014 | Takani | G09G 3/3688 345/94 |
| 2016/0190228 | A1 | 6/2016 | Park | |
| 2017/0345381 | A1 | 11/2017 | Hou et al. | |
| 2020/0168175 | A1* | 5/2020 | Tsuchi | G09G 3/3685 |
| 2022/0068219 | A1* | 3/2022 | Yoo | G09G 3/3258 |
| 2022/0114954 | A1* | 4/2022 | Ozaki | G09G 3/3233 |

FOREIGN PATENT DOCUMENTS

| | | | |
|---|---|---|---|
| JP | 2016-057433 | A | 4/2016 |
| JP | 2020-067640 | A | 4/2020 |
| JP | 2021-026234 | A | 2/2021 |
| KR | 10-2021-0017085 | A | 2/2021 |

* cited by examiner

DISPLAY DEVICE

CROSS REFERENCE TO RELATED APPLICATIONS

This application is a U.S. National Phase of International Patent Application No. PCT/JP2022/040060 filed on Oct. 27, 2022. which claims priority benefit of Japanese Patent Application No. JP 2021-206117 filed in the Japan Patent Office on Dec. 20, 2021. Each of the above-referenced applications is hereby incorporated herein by reference in its entirety.

TECHNICAL FIELD

Embodiments according to the present disclosure relate to a display device.

BACKGROUND ART

In recent years, in a field of a display device that performs image display, a planar display device in which pixels (pixel circuits) including light emitting elements are arranged in a matrix form has been rapidly spread. For the planar display device, as the light emitting element of a pixel, an organic EL display device using a so-called current drive type electro-optical element in which light emission luminance changes according to a current value flowing through the device, for example, an organic electro luminescence (EL) element utilizing a phenomenon in which light is emitted when an electric field is applied to an organic thin film has been developed and commercialized.

A power supply voltage is supplied from a power supply for driving pixels, circuits, and the like in the display device (see, for example, Patent Document 1).

CITATION LIST

Patent Document

Patent Document 1: Japanese Patent Application Laid-Open No. 2020-67640

SUMMARY OF THE INVENTION

Problems to be Solved by the Invention

However, for example, IR drop (voltage drop) may occur due to wiring resistance of the power supply wiring, and the luminance may be reduced.

Therefore, the present disclosure provides a display device capable of suppressing a decrease in luminance.

Solutions to Problems

In order to solve the above problem, according to the present disclosure, there is provided a display device including:

a plurality of pixels;

a gradation voltage generation unit that generates a gradation voltage;

a reference voltage supply wiring at least partially extending in a pixel region in which the plurality of pixels is arranged, the reference voltage supply wiring supplying a reference voltage to the pixels; and a lead-out wiring electrically connected to the reference voltage supply wiring at a voltage lead-out position on the reference voltage supply wiring, in which the gradation voltage generation unit generates the gradation voltage on the basis of the reference voltage supplied from the lead-out wiring.

The plurality of pixels may be arranged in the pixel region, the reference voltage supply wiring may be supplied with the reference voltage from a reference voltage supply unit arranged at a position different from the pixel region, and the lead-out wiring may supply the gradation voltage generation unit with a voltage at the voltage lead-out position on the reference voltage supply wiring according to a position of the pixel with respect to the reference voltage supply unit.

The lead-out wiring may be provided for each of a plurality of the voltage lead-out positions on the reference voltage supply wiring, and the gradation voltage generation unit may be provided for each of a plurality of the lead-out wirings.

The display device may further include a drive unit that supplies a signal voltage corresponding to the gradation voltage to the plurality of pixels, in which a plurality of the gradation voltage generation units may be arranged at a plurality of positions with respect to the drive unit according to a plurality of the voltage lead-out positions with respect to the reference voltage supply wiring.

One of two of the gradation voltage generation units may supply a first gradation voltage to the gradation voltage supply wiring from a first supply position on the gradation voltage supply wiring, another of the two of the gradation voltage generation units may supply a second gradation voltage to the gradation voltage supply wiring from a second supply position on the gradation voltage supply wiring, and a voltage of the gradation voltage supply wiring at a position between the first supply position and the second supply position may have a voltage level between the first gradation voltage and the second gradation voltage.

The plurality of pixels may be arranged in the pixel region, the reference voltage supply wiring may be supplied with the reference voltage from a reference voltage supply unit arranged at a position different from the pixel region, and the lead-out wiring may include:

a first lead-out wiring that supplies a voltage at the voltage lead-out position on the reference voltage supply wiring according to a position of a first pixel closest to the reference voltage supply unit to a first gradation voltage generation unit included in the gradation voltage generation unit; and a second lead-out wiring that supplies a voltage at the voltage lead-out position on the reference voltage supply wiring according to a position of a second pixel farthest from the reference voltage supply unit to a second gradation voltage generation unit included in the gradation voltage generation unit.

The display device may further include a drive unit that supplies a signal voltage corresponding to the gradation voltage to the plurality of pixels, in which the first gradation voltage generation unit and the second gradation voltage generation unit may be disposed to sandwich the drive unit.

The lead-out wiring may further include a third lead-out wiring that supplies a voltage at the voltage lead-out position on the reference voltage supply wiring according to a position of a third pixel disposed between the first pixel and the second pixel to a third gradation voltage generation unit included in the gradation voltage generation unit.

The third gradation voltage generation unit may be disposed between the first gradation voltage generation unit and the second gradation voltage generation unit.

The lead-out wiring may supply a voltage at one of the voltage lead-out positions on the reference voltage supply wiring to the gradation voltage generation unit.

The plurality of pixels may be arranged in the pixel region, the reference voltage supply wiring may be supplied with the reference voltage from a reference voltage supply unit arranged at a position different from the pixel region, and the lead-out wiring may supply the gradation voltage generation unit with a voltage at the voltage lead-out position on the reference voltage supply wiring according to a position of a second pixel farthest from the reference voltage supply unit.

The plurality of pixels may be arranged in the pixel region, the reference voltage supply wiring may be supplied with the reference voltage from a reference voltage supply unit arranged at a position different from the pixel region, and the lead-out wiring may supply the gradation voltage generation unit with a voltage at the voltage lead-out position on the reference voltage supply wiring according to a position of the pixel disposed between a first pixel closest to the reference voltage supply unit and a second pixel farthest from the reference voltage supply unit.

The plurality of pixels may be arranged in the pixel region, the reference voltage supply wiring may be supplied with the reference voltage from a reference voltage supply unit arranged at a position different from the pixel region, and the pixel region and the reference voltage supply unit may be arranged side by side in a supply direction of a signal voltage to the pixel.

The plurality of pixels may be arranged in the pixel region, the reference voltage supply wiring may be supplied with the reference voltage from a reference voltage supply unit arranged at a position different from the pixel region, and the pixel region and the reference voltage supply unit may be arranged side by side in a direction different from a supply direction of a signal voltage to the pixel.

The reference voltage supply wiring may include:

a first reference voltage supply wiring arranged to cover a periphery of the plurality of pixels; and a second reference voltage supply wiring connected between the first reference voltage supply wiring and the pixel and having a wiring resistance higher than a wiring resistance of the first reference voltage supply wiring, and the lead-out wiring may supply a voltage at the voltage lead-out position on the first reference voltage supply wiring to the gradation voltage generation unit.

The reference voltage may be a power supply voltage on a high potential side supplied to the pixel.

The reference voltage may be a power supply voltage on a low potential side supplied to the pixel.

The gradation voltage generation unit may include a plurality of resistance elements connected in series, and includes a ladder resistance circuit that outputs the gradation voltage from an end portion of each of the resistance elements on the basis of the reference voltage supplied from the lead-out wiring.

The gradation voltage generation unit may include:

a ramp wave voltage generation unit that generates a ramp wave voltage whose voltage level changes with time on the basis of the reference voltage supplied from the lead-out wiring; and a timing control unit that generates the gradation voltage by controlling a timing of supplying the ramp wave voltage on the basis of luminance of the plurality of pixels.

MODE FOR CARRYING OUT THE INVENTION

Hereinafter, embodiments of a display device will be described with reference to the drawings. Although main components of the display device will be mainly described below, the display device may have a component or function that is not illustrated or described. The following description does not exclude components and functions that are not depicted or described.

First Embodiment

Here, as a display device to which the technology of the present disclosure is applied, an active matrix type organic EL display device in which an organic EL element, which is an example of a current drive type light emitting element, is a light emitting unit (light emitting element) of a pixel (pixel circuit) will be described as an example. However, the technology of the present disclosure is not limited to application to an organic EL display device. That is, the technology of the present disclosure can be applied to all display devices in which one gradation voltage corresponding to an input digital video signal is selected from a plurality of gradation voltages generated by a gradation voltage occurrence circuit to be converted into an analog video signal, and the light emitting element is driven by the analog video signal.

[System Configuration]

Figure 1:
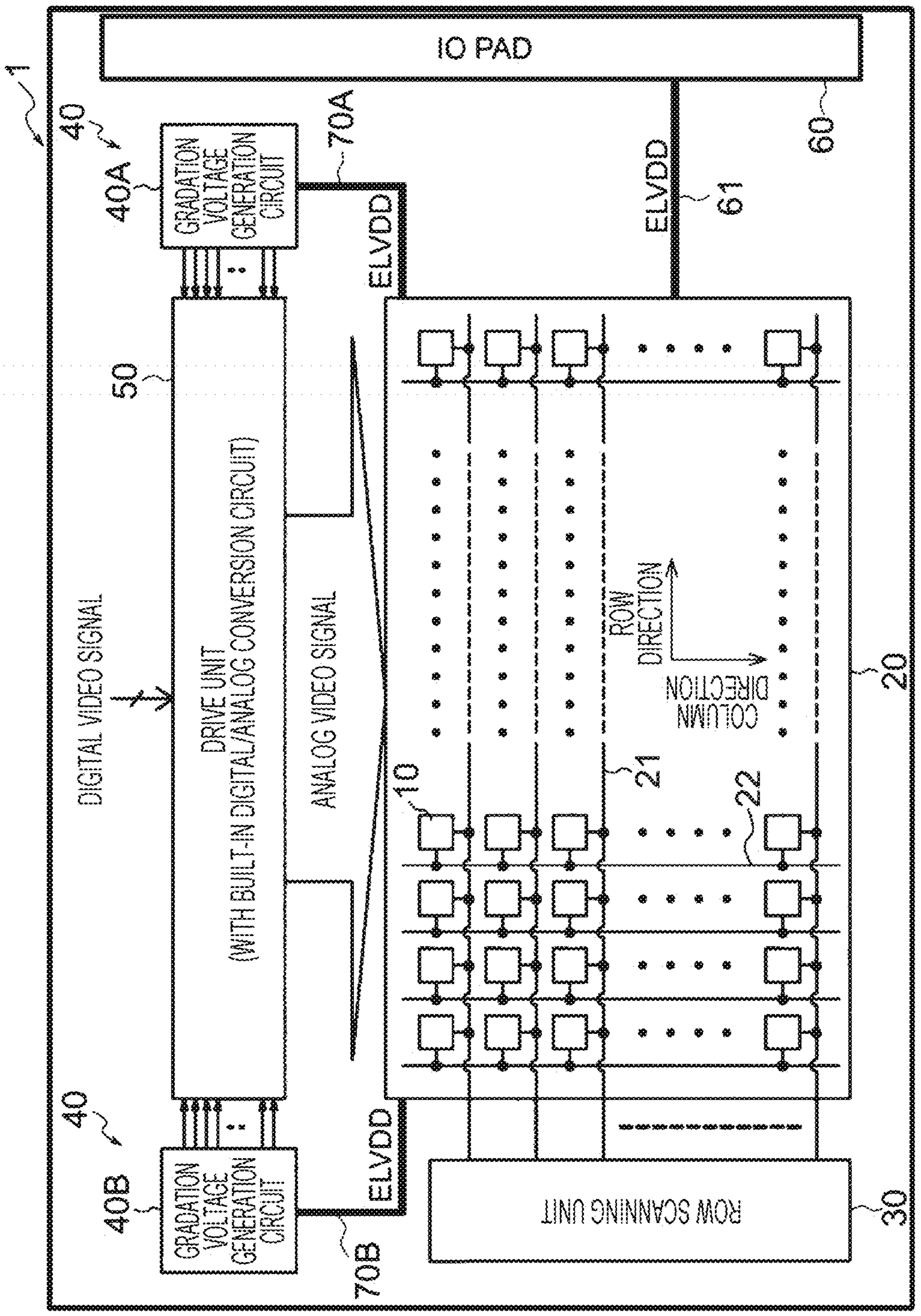
FIG. 1 is a block diagram schematically illustrating a system configuration of a display device according to a first embodiment.

FIG. 1 is a block diagram schematically illustrating a system configuration of a display device 1 according to a first embodiment.

As illustrated in FIG. 1, the display device 1 according to the first embodiment includes a pixel unit 20 in which pixels 10 including light emitting elements (light emitting units) are two-dimensionally arranged in a matrix (matrix), for example, two row scanning units 30, a gradation voltage generation circuit 40, a drive unit 50, an input/output (IO) pad 60, and lead-out wiring 70. In the pixel unit 20, a scanning line 21 is wired for each pixel row and a signal line 22 is wired for each pixel column with respect to the pixel arrangement in a matrix.

Furthermore, the pixel unit 20 is also a pixel region in which the plurality of pixels 10 is arranged.

The row scanning unit 30 is provided on the left side of the pixel unit 20, for example. The row scanning unit 30 includes a shift register, an address decoder, and the like, and sequentially outputs a scanning signal for selecting each pixel 10 of the pixel unit 20 in units of rows from the left side of the pixel unit 20 with respect to the scanning line 21. Note that, although the row scanning unit 30 is arranged on the left side of the pixel unit 20 here, it is also possible to arrange the row scanning unit 30 on the right side of the pixel unit 20, and it is also possible to adopt a configuration in which two row scanning units 30 are arranged on both left and right sides.

The gradation voltage generation circuit 40 generates a number of gradation voltages corresponding to the bit depth of the digital video signal input to the drive unit 50. In the example illustrated in FIG. 1, although details will be described later, the gradation voltage generation circuit 40 includes a ladder resistance circuit formed by connecting a plurality of resistors in series and outputting a plurality of gradation voltages having different voltage values from end portions of the resistors. As an example, in a case where the digital video signal is 8 bits, gradation voltage generation circuit 40 generates 256 gradation voltages.

Further, the gradation voltage generation circuit (gradation voltage generation unit) 40 generates the gradation voltage on the basis of the first reference voltage. The first reference voltage is a voltage serving as a reference of the gradation voltage, and is a voltage supplied from the lead-out wiring 70.

Furthermore, in the example illustrated in FIG. 1, a plurality of gradation voltage generation circuits 40 is provided. The gradation voltage generation circuit 40 includes two gradation voltage generation circuits, that is, a first gradation voltage generation circuit 40A and a second gradation voltage generation circuit 40B. The first gradation voltage generation circuit 40A is disposed to the right of the drive unit 50. The second gradation voltage generation circuit 40B is disposed to the left of the drive unit 50.

The drive unit 50 incorporates a digital/analog conversion circuit (hereinafter, sometimes referred to as a digital to analog converter (DAC)), and selects one gradation voltage corresponding to an input digital video signal from a plurality of gradation voltages generated by the gradation voltage generation circuit 40 to convert the gradation voltage into an analog video signal. The analog video signal output from the drive unit 50 is supplied to the pixel row selectively scanned by the row scanning unit 30 through the signal line 22, and the light emitting element of each pixel 10 of the pixel row is driven to emit light.

Furthermore, the drive unit 50 supplies a signal voltage Vsig corresponding to the gradation voltage to the plurality of pixels 10.

The IO pad 60 is arranged at a position different from the pixel unit 20, that is, the pixel region. In the example illustrated in FIG. 1, the IO pad 60 is disposed to the right of the pixel unit 20 and the first gradation voltage generation circuit 40A. The IO pad 60 supplies the second reference voltage to the pixel unit 20 (pixel 10) via the power supply wiring 61. The second reference voltage is a power supply voltage supplied to the pixel 10 for driving the pixel 10. In the example illustrated in FIG. 1, the second reference voltage is the voltage ELVDD.

The power supply wiring 61 is a wiring connected between the pixel unit 20 and the IO pad 60. The power supply wiring 61 is a wiring to which the second reference voltage (reference voltage) is supplied from the IO pad (reference voltage supply unit) 60.

The lead-out wiring 70 is connected between the pixel unit 20 (pixel 10) and the gradation voltage generation circuit 40. The lead-out wiring 70 supplies the voltage of the power supply wiring (reference voltage supply wiring) 61 that supplies the second reference voltage to the pixel 10 to the gradation voltage generation circuit 40 as the first reference voltage so as to be used for generation of the gradation voltage. That is, the lead-out wiring 70 draws the power supply voltage of the pixel 10 back to the gradation voltage generation circuit 40.

In addition, in the example illustrated in FIG. 1, a plurality of lead-out wirings 70 is provided. The lead-out wiring 70 includes two lead-out wirings, that is, a first lead-out wiring 70A and a second lead-out wiring 70B. The first lead-out wiring 70A supplies the power supply voltage of the pixel 10 to the first gradation voltage generation circuit 40A. The second lead-out wiring 70B supplies the power supply voltage of the pixel 10 to the second gradation voltage generation circuit 40B. Note that the first lead-out wiring 70A and the second lead-out wiring 70B respectively draw the power supply voltages of two pixels 10 different from each other to the first gradation voltage generation circuit 40A and the second gradation voltage generation circuit 40B.

In FIG. 1, the voltage drawn from the pixel 10 by the first lead-out wiring 70A and the second lead-out wiring 70B is described as a voltage ELVDD. However, the voltage drawn back by the lead-out wiring 70 may fluctuate to a voltage different from the voltage ELVDD, which is the second reference voltage, as will be described later with reference to FIG. 3. As a result, a more appropriate gradation voltage can be generated, and a decrease in luminance of the display device 1 can be suppressed.

The pixel unit 20 (pixel region) and the IO pad 60 are arranged in a direction different from the supply direction of the signal voltage Vsig to the pixel 10. The supply direction of the signal voltage Vsig is, for example, the direction in which the signal line 22 extends, and is the up-down direction in FIG. 1. The direction different from the supply direction of the signal voltage Vsig is, for example, a direction perpendicular to the direction in which the signal line 22 extends, and is the left-right direction in FIG. 1.

Figure 2:
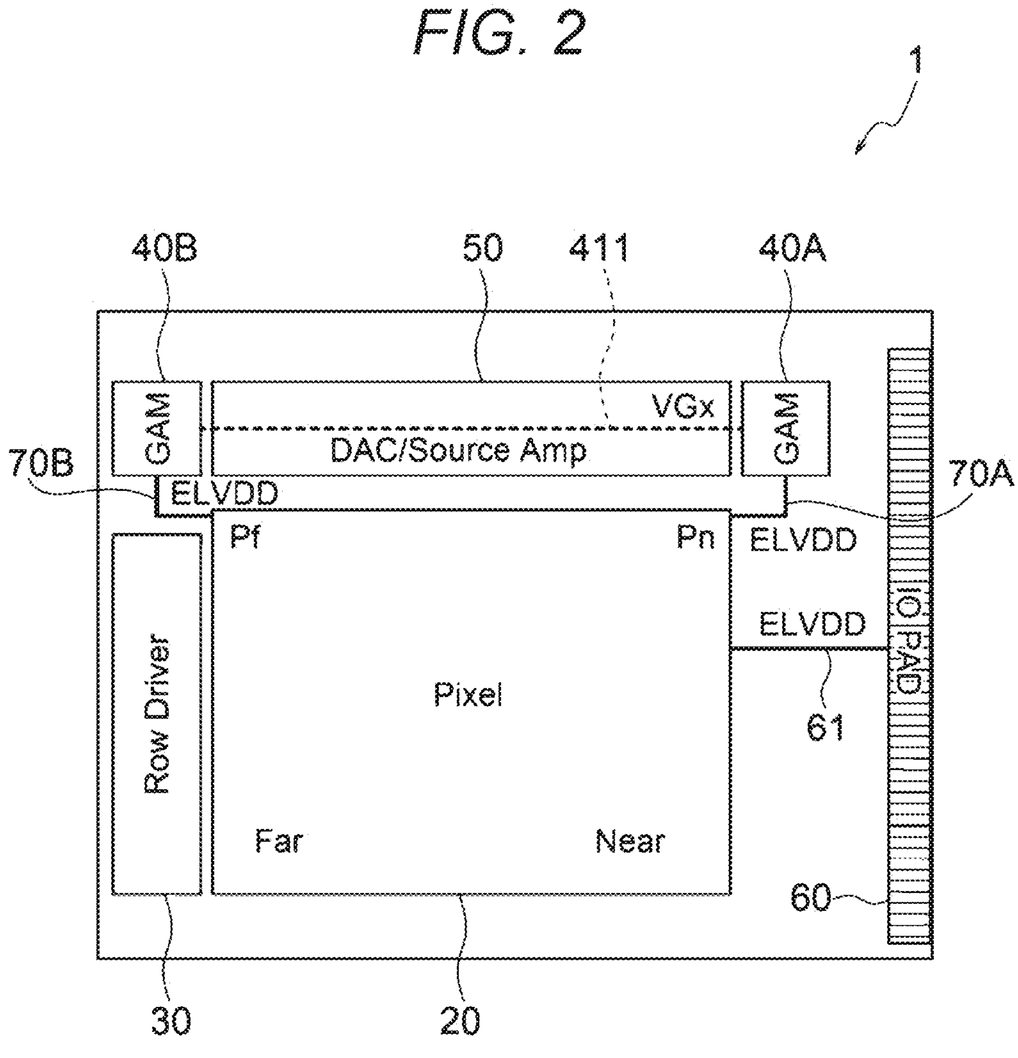
FIG. 2 is a block diagram illustrating an example of a schematic configuration of the display device according to the first embodiment.

FIG. 2 is a block diagram illustrating an example of a schematic configuration of the display device 1 according to the first embodiment. Note that FIG. 2 is a schematic diagram of FIG. 1.

The IO pad 60 is disposed to the right of the pixel unit 20 and the first gradation voltage generation circuit 40A. The power supply wiring 61 electrically connected to the IO pad 60 is electrically connected to the right end of the pixel unit 20. The pixel 10 arranged on the right side of the pixel unit 20 is a pixel arranged at a position Pn relatively close to the IO pad 60 (see "Near" in FIG. 2). The pixel 10 arranged on the left side of the pixel unit 20 is a pixel arranged at a position Pf relatively far from the IO pad 60 (see "Far" in FIG. 2).

The first lead-out wiring 70A extracts the power supply voltage of the pixel 10 at the position Pn close to the IO pad 60, and supplies the power supply voltage to the first gradation voltage generation circuit 40A. The second lead-out wiring 70B extracts the power supply voltage of the pixel 10 at the position Pf far from the IO pad 60, and supplies the power supply voltage to the second gradation voltage generation circuit 40B.

The first gradation voltage generation circuit 40A and the second gradation voltage generation circuit 40B are disposed on the left and right sides of the drive unit 50. That is, the first gradation voltage generation circuit 40A and the second gradation voltage generation circuit 40B are disposed so as to sandwich the drive unit 50 therebetween.

In addition, the first gradation voltage generation circuit 40A and the second gradation voltage generation circuit 40B are electrically connected via a gradation voltage supply wiring 411. The drive unit 50 is disposed on the gradation voltage supply wiring 411. The first gradation voltage generation circuit 40A and the second gradation voltage generation circuit 40B output a gradation voltage VGx (in a case where the digital video signal is 8 bits, x=0 to 255) to the gradation voltage supply wiring 411.

The difference between the voltage extracted from the pixel 10 at the position Pn by the first lead-out wiring 70A and the voltage extracted from the pixel 10 at the position Pf by the second lead-out wiring 70B is caused by, for example, the power supply wiring 61.

[Power Supply Wiring]

Figure 3:
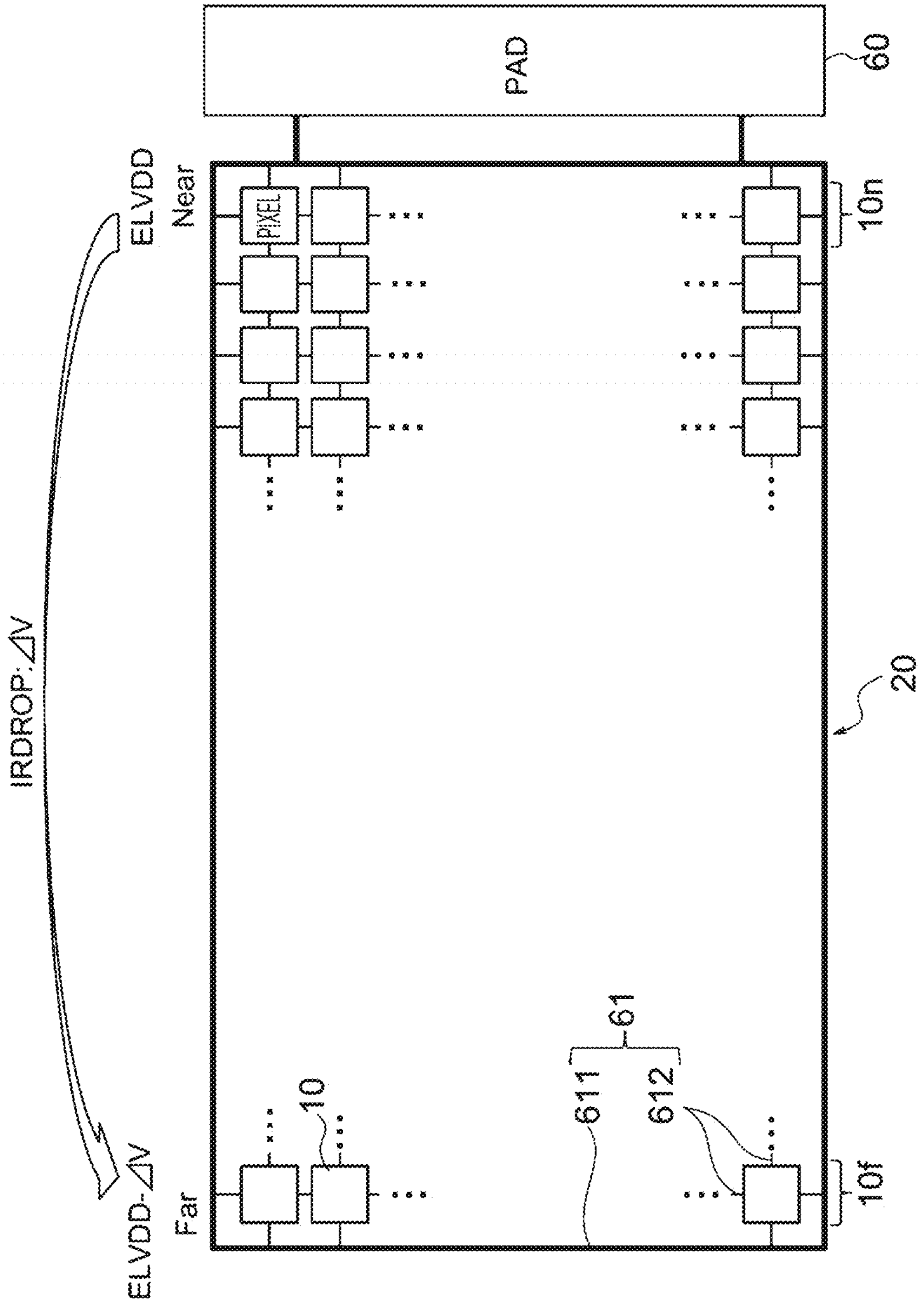
FIG. 3 is a diagram illustrating an example of a configuration of a power supply wiring in the display device according to the first embodiment.

FIG. 3 is a diagram illustrating an example of a configuration of the power supply wiring 61 in the display device 1 according to the first embodiment.

The power supply wiring 61 is connected between the IO pad 60 and the pixel 10. At least a part of the power supply wiring 61 extends along a predetermined direction in the pixel region. The power supply wiring 61 supplies a power supply voltage (for example, the voltage ELVDD) from the IO pad 60 to a power supply voltage node (see FIG. 4) of the pixel 10.

The power supply wiring 61 includes an outer peripheral power supply wiring 611 and an in-pixel power supply wiring 612.

The outer peripheral power supply wiring (first reference voltage supply wiring) 611 is disposed so as to surround the plurality of pixels 10, that is, the outer periphery of the pixel unit 20 (pixel region). The outer peripheral power supply wiring 611 is disposed in, for example, an annular shape. In the example illustrated in FIG. 3, the outer peripheral power supply wiring 611 is provided in a square ring shape. Furthermore, in the example illustrated in FIG. 3, the outer peripheral power supply wiring 611 is provided to extend to the IO pad 60 so as to be electrically connected to the IO pad 60.

The in-pixel power supply wiring (second reference voltage supply wiring) 612 is connected between the outer peripheral power supply wiring 611 and the pixel 10. The in-pixel power supply wiring 612 is arranged to extend into the pixel 10, and supplies a power supply voltage to the pixel 10. The in-pixel power supply wiring 612 is arranged, for example, in a mesh shape (lattice shape). The pixels 10 are arranged at intersections of meshes of the in-pixel power supply wiring 612. The power supply voltage nodes of the adjacent pixels 10 are connected to each other by the in-pixel power supply wiring 612.

The resistance value of the wiring resistance of the in-pixel power supply wiring 612 is higher than the resistance value of the wiring resistance of the outer peripheral power supply wiring 611. That is, the resistance value of the wiring resistance of the outer peripheral power supply wiring 611 is lower than the resistance value of the wiring resistance of the in-pixel power supply wiring 612. The outer peripheral power supply wiring 611 is thicker than the in-pixel power supply wiring 612, for example. As described above, the IO pad 60 supplies the voltage ELVDD to the power supply wiring 61 as the second reference voltage. The current flowing from the IO pad 60 to the power supply wiring 61 passes through a current path having the lowest resistance and flows into the pixel 10. Depending on the magnitude of the resistance value, the current normally passes through a current path in which the distance of the outer peripheral power supply wiring 611 is as long as possible and the distance of the in-pixel power supply wiring 612 is as short as possible. For example, the current passes through the outer peripheral power supply wiring 611 up to the pixel column of the target pixel 10, and then passes through the in-pixel power supply wiring 612 to flow to the target pixel 10. Note that the current flowing through the pixel 10 may pass through a plurality of current paths.

Here, in a case where the current passes through the outer peripheral power supply wiring 611, IR drop (voltage drop) may occur due to the wiring resistance of the outer peripheral power supply wiring 611 extending in the left-right direction in FIG. 3. The IR drop becomes smaller as it is closer to the IO pad 60, and becomes larger as it is farther from the IO pad 60.

Note that, due to the magnitude of the resistance, the current flowing in the left-right direction in FIG. 3 is more likely to flow through the outer peripheral power supply wiring 611 than the in-pixel power supply wiring 612. Therefore, the IR drop is mainly affected by the wiring resistance of the outer peripheral power supply wiring 611.

The size of the IR drop at the position on the outer peripheral power supply wiring 611 far from the IO pad 60 is represented by, for example, ΔV. As illustrated in FIG. 3, the voltage at the position on the outer peripheral power supply wiring 611 close to the IO pad 60 is, for example, the voltage ELVDD. The voltage at the position on the outer peripheral power supply wiring 611 far from the IO pad 60 is, for example, the voltage ELVDD−ΔV. As described above, the voltage of the outer peripheral power supply wiring 611, that is, the power supply voltage of the pixel 10 may fluctuate depending on the position from the IO pad 60.

The fluctuation of the power supply voltage of the pixel 10 due to the IR drop may affect the driving of the pixel 10.

[Pixel Circuit]

Figure 4:
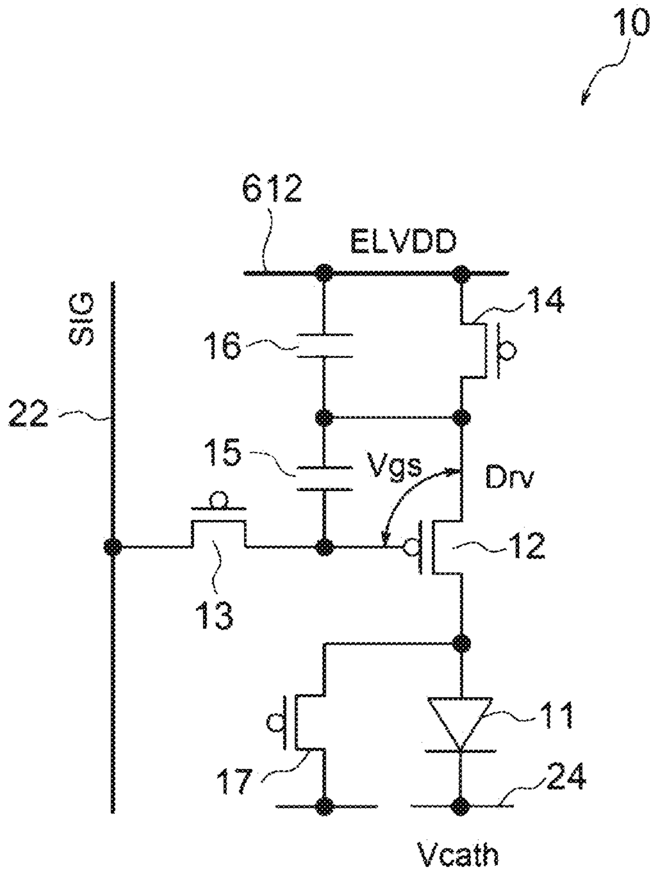
FIG. 4 is a circuit diagram illustrating an example of a configuration of a pixel (pixel circuit) in the display device according to the first embodiment.

FIG. 4 is a circuit diagram illustrating an example of a configuration of a pixel (pixel circuit) 10 in the display device 1 according to the first embodiment.

As illustrated in FIG. 4, the pixel 10 includes an organic EL element 11 which is an example of a current drive type light emitting element, and a drive circuit which drives the organic EL element 11 by applying a current to the organic EL element 11. In the organic EL element 11, a cathode electrode is connected to a common power supply wiring 24 wired in common for all the pixels 10.

The drive circuit that drives the organic EL element 11 includes a drive transistor 12, a sampling transistor 13, a light emission control transistor 14, a holding capacitance 15, an auxiliary capacitance 16, and an auto-zero transistor 17. Note that a P-channel transistor is used as the drive transistor 12 on the assumption that the drive transistor is formed not on an insulator such as a glass substrate but on a semiconductor such as silicon. Furthermore, in the present circuit example, P-channel transistors are also used for the sampling transistor 13, the light emission control transistor 14, and the auto-zero transistor 17, similarly to the drive transistor 12.

In the present circuit example, the pixel transistor includes a light emission control transistor 14 in addition to the drive transistor 12 and the sampling transistor 13. Therefore, in addition to the row scanning unit 30 illustrated in FIG. 1, a drive scanning unit (not illustrated) that drives the light emission control transistor 14 is provided. The drive scanning unit outputs a light emission control signal for driving the light emission control transistor 14 in units of rows to a control line (not illustrated) wired for each pixel row.

In addition, the pixel transistor includes the auto-zero transistor 17. The auto-zero transistor 17 controls the organic EL element 11 not to emit light during a non-light emission period of the organic EL element 11 under driving by a drive signal from an auto-zero scanner (not illustrated).

In the pixel 10 having the above configuration, the sampling transistor 13 samples the signal voltage Vsig of the video signal supplied from the drive unit 50 through the signal line 22 under the driving by the scanning signal supplied from the row scanning unit 30, and writes the signal voltage Vsig into the pixel 10. The light emission control transistor 14 is connected in series to the drive transistor 12. More specifically, the light emission control transistor 14 is connected between a power supply voltage node (in-pixel power supply wiring 612) on the high potential side and a source electrode of the drive transistor 12, and controls light emission/non-light emission of the organic EL element 11 under driving by a light emission control signal given from the drive scanning unit. For example, the voltage ELVDD is supplied from the in-pixel power supply wiring 612 which is a power supply voltage node on the high potential side.

The holding capacitance 15 is connected between a gate electrode and a source electrode of the drive transistor 12, and holds a signal voltage Vsig written by sampling by the sampling transistor 13. The drive transistor 12 drives the organic EL element 11 to emit light by causing a drive current corresponding to the signal voltage Vsig held by the holding capacitance 15 to flow through the organic EL element 11. The auxiliary capacitance 16 is connected between the source electrode of the drive transistor 12 and a node (for example, the in-pixel power supply wiring 612) of a fixed potential. The auxiliary capacitance 16 suppresses fluctuation of the source potential of the drive transistor 12 when the signal voltage Vsig is written, and acts to set the gate-source voltage Vgs of the drive transistor 12 to the threshold voltage Vth of the drive transistor 12.

Here, since the organic EL element 11 is a current drive type light emitting element, a gradation of light emission is obtained by controlling a current value flowing through the device. In controlling the current value flowing through the organic EL element 11, the signal voltage Vsig of the video signal is written in the gate electrode of the drive transistor 12, and the overdrive voltage when the drive transistor 12 is used as a current source is controlled. The overdrive voltage is a voltage higher than a voltage for obtaining a desired gradation.

Note that, in the present circuit example, the pixel circuit including the light emission control transistor 14 in addition to the drive transistor 12 and the sampling transistor 13 has been described as an example, but the pixel circuit may have a circuit configuration not including the light emission control transistor 14.

In the example illustrated in FIG. 4, the second reference voltage (reference voltage), which is a power supply voltage supplied to the pixel 10, is a power supply voltage on the high potential side (positive electrode side) supplied to the pixel 10. At the time of light emission of the pixel 10, the power supply voltage (for example, the voltage ELVDD) on the high potential side affects the gate-source voltage Vgs of the drive transistor 12, that is, the luminance of the pixel 10. Therefore, the fluctuation of the power supply voltage of the pixel 10 due to the IR drop illustrated in FIG. 3 leads to the fluctuation of the luminance of the pixel 10.

Therefore, as illustrated in FIG. 2, the lead-out wiring 70 supplies the voltage of the power supply wiring 61 corresponding to the position of the pixel 10 with respect to the IO pad 60, that is, the voltage at the voltage lead-out position Pv on the power supply wiring 61 corresponding to the distance between the IO pad 60 and the pixel 10, to the gradation voltage generation circuit 40. As a result, the gradation voltage generation circuit 40 can generate a more appropriate gradation voltage according to the position of the pixel 10 with respect to the IO pad 60. As a result, a decrease in luminance can be suppressed.

[Pixel Unit, Gradation Voltage Generation Circuit, and Drive Unit]

Figure 5:
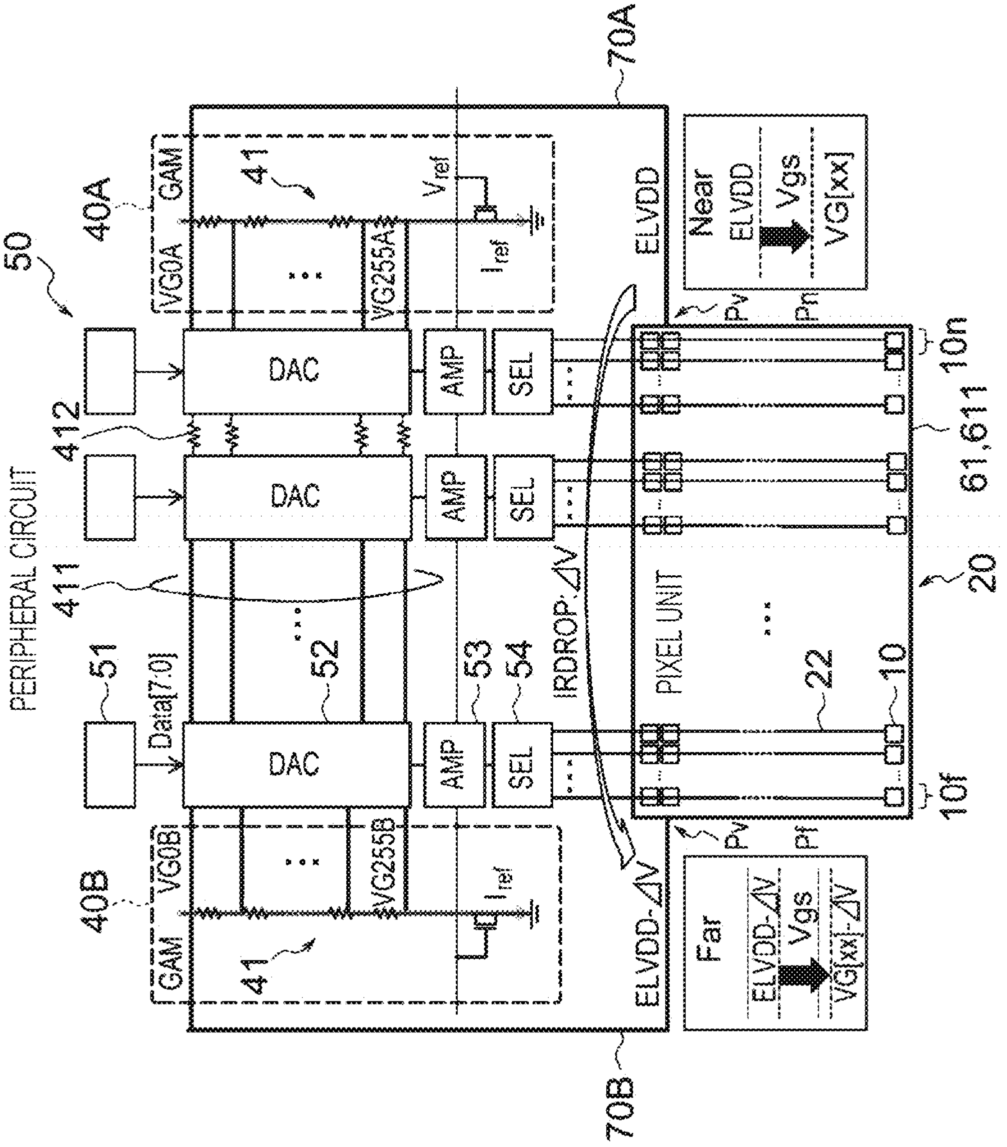
FIG. 5 is a circuit diagram illustrating an example of a configuration of a pixel unit, a first gradation voltage generation circuit, a second gradation voltage generation circuit, and a drive unit according to the first embodiment.
Figure 6:
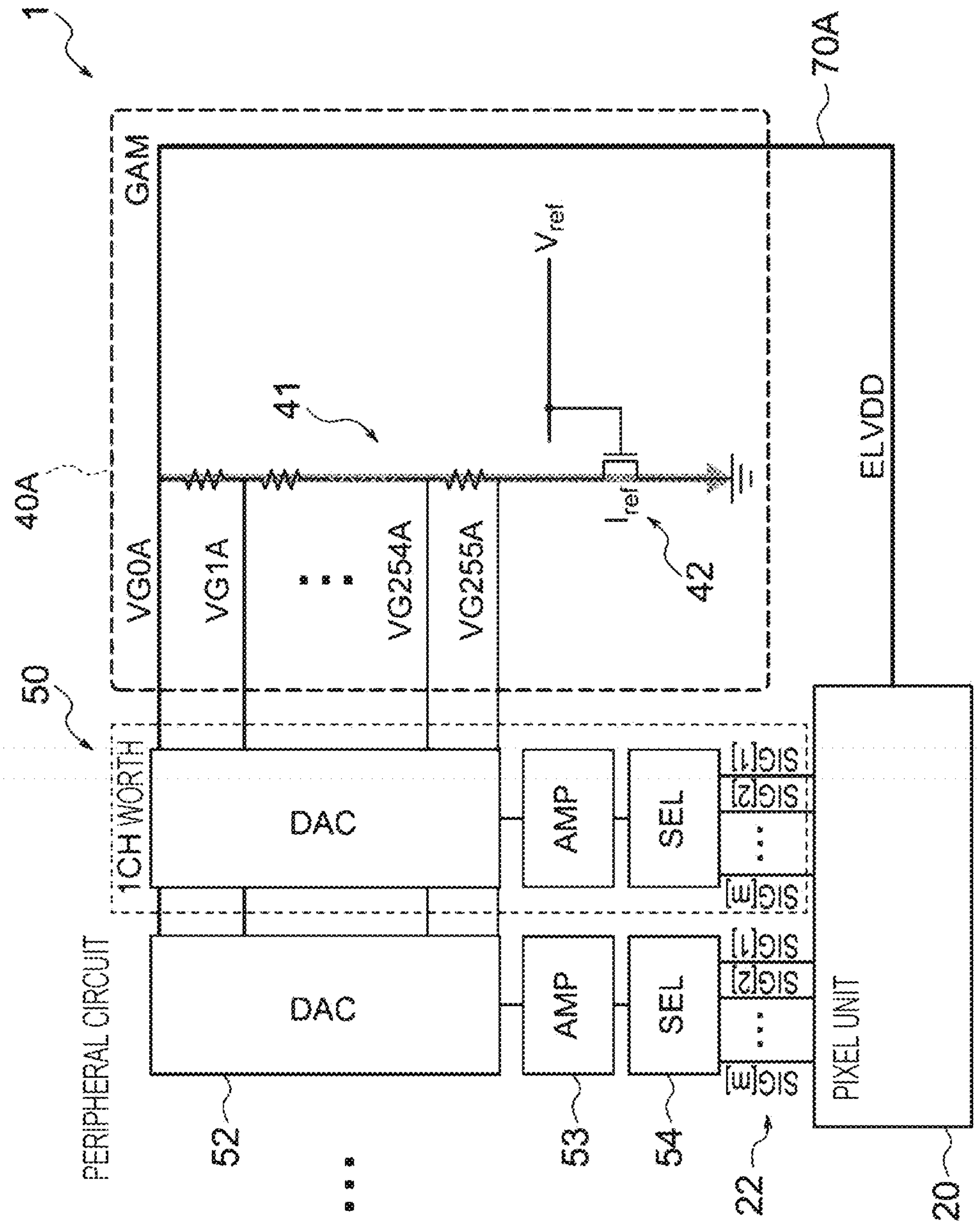
FIG. 6 is a circuit diagram illustrating an example of a configuration of a first gradation voltage generation circuit according to the first embodiment and its periphery.

FIG. 5 is a circuit diagram illustrating an example of a configuration of the pixel unit 20, the first gradation voltage generation circuit 40A, the second gradation voltage generation circuit 40B, and the drive unit 50 according to the first embodiment. FIG. 6 is a circuit diagram illustrating an example of a configuration of the first gradation voltage generation circuit 40A according to the first embodiment and its periphery. FIGS. 5 and 6 also illustrate a circuit example of the ladder resistance circuit 41 in which a plurality of resistors is connected in series in each of the first gradation voltage generation circuit 40A and the second gradation voltage generation circuit 40B. Here, as an example, a case where the digital video signal is 8 bits and the ladder resistance circuit 41 generates 256 gradation voltages VG0 to VG255 corresponding thereto is illustrated. More specifically, the first gradation voltage generation circuit 40A generates first gradation voltages VG0A to VG255A, and the second gradation voltage generation circuit 40B generates second gradation voltages VG0B to VG255B.

The lead-out wiring 70 is provided for each of the plurality of voltage lead-out positions Pv on the power supply wiring 61. The voltage lead-out position Pv is, for example, a connection position between the outer peripheral power supply wiring 611 and the lead-out wiring 70. That is, the lead-out wiring 70 is electrically connected to the power supply wiring 61 at the voltage lead-out position Pv on the power supply wiring 61. In the example illustrated in FIG. 5, the first lead-out wiring 70A and the second lead-out wiring 70B are provided. In the example illustrated in FIG. 5, two voltage lead-out positions Pv are connection positions of the outer peripheral power supply wiring 611 and the first lead-out wiring A, and connection positions of the outer peripheral power supply wiring 611 and the second lead-out wiring 70B.

In addition, no element such as a capacitor is provided between the power supply wiring 61 and the gradation voltage generation circuit 40. Therefore, the lead-out wiring 70 directly supplies the voltage at the voltage lead-out position Pv to the gradation voltage generation circuit 40 without an element such as a capacitor. The gradation voltage generation circuit 40 generates a gradation voltage on the basis of the reference voltage supplied from the lead-out wiring. This makes it possible to cope with direct current (DC) fluctuations in the power supply voltage of the pixel 10.

The first lead-out wiring 70A supplies the voltage at the voltage lead-out position Pv on the power supply wiring 61 corresponding to the position (position Pn) of the first pixel 10$n$ closest to the IO pad 60 to the first gradation voltage generation circuit 40A. The first pixel 10$n$ includes, for example, a plurality of pixels 10 in the pixel column closest to the IO pad 60.

The second lead-out wiring 70B supplies the voltage at the voltage lead-out position Pv on the power supply wiring 61 corresponding to the position (position Pf) of the second pixel 10$f$ farthest from the IO pad 60 to the second gradation voltage generation circuit 40B. The second pixel 10$f$ includes, for example, a plurality of pixels 10 in a pixel column farthest from the IO pad 60.

The gradation voltage generation circuit 40 is provided for each of the plurality of lead-out wirings 70. In the example illustrated in FIG. 5, the first gradation voltage generation circuit 40A and the second gradation voltage generation circuit 40B are provided.

The plurality of gradation voltage generation circuits 40 is arranged at a plurality of positions with respect to the drive unit 50 according to the plurality of voltage lead-out positions Pv with respect to the power supply wiring 61. The voltage drawn from the first pixel 10$n$ arranged on the right side of the pixel unit 20 is supplied to the first gradation voltage generation circuit 40A arranged on the right side of the drive unit 50. The voltage drawn from the second pixel 10$f$ arranged on the left side of the pixel unit 20 is supplied to the second gradation voltage generation circuit 40B arranged on the left side of the drive unit 50.

As illustrated in FIG. 5, the drive unit 50 has a configuration in which a unit circuit (1CH illustrated in FIG. 6) including a shift register 51, a DAC 52, an amplifier (AMP) 53, and a selector (SEL) 54 is provided according to the number of pixel columns, that is, the number of signal lines 22. For example, the shift register 51 outputs 8-bit video data Data [7:0] for each unit circuit. Note that the shift register 51 is omitted in FIG. 6. The DAC 52 selects and outputs one gradation voltage corresponding to the video data Data [7:0] output from the shift register 51 from among the 256 gradation voltages VG0 to VG255 provided from the gradation voltage generation circuit 40. The amplifier 53 amplifies the gradation voltage output from the DAC 52 and outputs the same to the selector 54 as a signal voltage Vsig which is an analog video signal.

m (for example, two to 12) signal lines 22 are connected to one selector 54. The selector 54 selects the signal line 22 as the output destination of the amplifier 53 in a time division manner (in a time division manner) to sequentially supply the signal voltage Vsig to the plurality of signal lines 22. Thus, the light emitting element of the pixel 10 is driven to emit light.

[Details of Gradation Voltage Generation Circuit]

As illustrated in FIG. 6, the gradation voltage generation circuit 40 includes a ladder resistance circuit 41 and a constant current source 42.

The ladder resistance circuit 41 has a configuration in which resistors of a number corresponding to the bit depth of a digital video signal are connected in series between a first power supply (high potential side power supply, in the first embodiment, power supply voltage node ELVDD) and a second power supply (low potential side power supply, in the first embodiment, ground GND). In the example illustrated in FIG. 6, the first power supply is electrically connected to the first lead-out wiring 70A. The power supply voltage node ELVDD of the first power supply becomes the first reference voltage (voltage VG0A illustrated in FIG. 6) of the first gradation voltage generation circuit 40A (ladder resistance circuit 41). The ladder resistance circuit 41 generates first gradation voltages VG0A to VG255A by resistance voltage division. The voltage VG0A is the highest voltage among the first gradation voltages VG0A to VG255A. Here, the resistance value of each resistor of the ladder resistance circuit 41 is determined according to, for example, the gamma characteristic of the pixel unit 20. In addition, the power supply on the high potential side of the ladder resistance circuit 41 is common to the power supply voltage node (for example, the power supply voltage node ELVDD) on the high potential side of the pixel (pixel circuit) 10.

The constant current source 42 is connected between the ladder resistance circuit 41 and the ground. The constant current source 42 is connected in series with the ladder resistance circuit 41. The constant current source 42 includes a current source transistor. A reference voltage Vref is input to a gate of the current source transistor.

As illustrated in FIGS. 5 and 6, the ladder resistance circuit 41 generates a gradation voltage by dividing a voltage from the voltage ELVDD by IR drop using the current value Iref of the constant current source 42 and the resistance value of the resistor of the ladder resistance circuit 41. The ladder resistance circuit 41 outputs a plurality of gradation voltages having different voltage values, for example, 256 gradation voltages VG0 to VG255 from end portions of the plurality of resistors.

Note that, since the second lead-out wiring 70B functions substantially similarly to the first lead-out wiring 70A, the description thereof will be omitted. The second gradation voltage generation circuit 40B functions substantially similarly to the first gradation voltage generation circuit 40A, and thus description thereof is omitted.

[Extraction of Power Supply Voltage and Generation of Gradation Voltage]

As illustrated in FIG. 5, the lead-out wiring 70 is electrically connected to the outer peripheral power supply wiring 611 of the power supply wiring 61, and supplies voltage at the voltage lead-out position Pv on the outer peripheral power supply wiring 611 to the gradation voltage generation circuit 40.

Each of the first lead-out wiring 70A and the second lead-out wiring 70B is electrically connected to, for example, a part of the annular portion of the outer peripheral power supply wiring 611.

The first lead-out wiring 70A is electrically connected to the voltage lead-out position Pv on the outer peripheral power supply wiring 611 corresponding to the position of the first pixel 10*n* closest to the IO pad 60. The first lead-out wiring 70A supplies a voltage (for example, the voltage ELVDD) at the voltage lead-out position Pv on the outer peripheral power supply wiring 611 corresponding to the position of the first pixel 10*n* as a first reference voltage (voltage VG0A) to the first gradation voltage generation circuit 40A.

The second lead-out wiring 70B is electrically connected to the voltage lead-out position Pv on the outer peripheral power supply wiring 611 corresponding to the position of the second pixel 10*f* farthest from the IO pad 60. The second lead-out wiring 70B supplies a voltage (for example, the voltage ELVDD-ΔV) at the voltage lead-out position Pv on the outer peripheral power supply wiring 611 corresponding to the position of the second pixel 10*f* to the second gradation voltage generation circuit 40B as a first reference voltage (voltage VG0B).

The first gradation voltage generation circuit 40A generates 256 first gradation voltages VG0A to VG255A using a voltage (for example, the voltage ELVDD) supplied from the first lead-out wiring 70A as a first reference voltage (voltage VG0A).

The second gradation voltage generation circuit 40B generates 256 second gradation voltages VG0B to VG255B using a voltage (for example, the voltage ELVDD−ΔV) supplied from the second lead-out wiring 70B as a first reference voltage (voltage VG0B). That is, the second gradation voltage generation circuit 40B generates second gradation voltages VG0B to VG255B lower than first gradation voltages VG0A to VG255A according to ΔV that is the IR drop.

Figure 7:
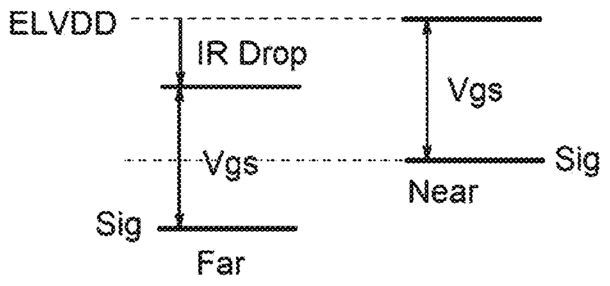
FIG. 7 is a schematic diagram illustrating a relationship between a gate-source voltage and IR drop in the display device according to the first embodiment.

FIG. 7 is a schematic diagram illustrating a relationship between the gate-source voltage Vgs and the IR drop in the display device 1 according to the first embodiment.

As described above, the drive unit 50 generates and outputs the signal voltage Vsig by selecting one gradation voltage from the plurality of gradation voltages VG0 to VG255. Therefore, the magnitude of the signal voltage Vsig also fluctuates according to the fluctuation of the gradation voltage supplied to the drive unit 50.

As illustrated in FIG. 7, in the second pixel 10*f* farthest from the IO pad 60, the IR drop increases, and the power supply voltage decreases. The power supply voltage in the second pixel 10*f* is lower than the voltage ELVDD, for example. However, depending on the magnitude (ΔV) of the IR drop, the signal voltage Vsig in the second pixel 10*f* is lower than the signal voltage Vsig in the first pixel 10*n*.

As described with reference to FIG. 4, the luminance of the pixel 10 fluctuates depending on the gate-source voltage Vgs of the drive transistor 12. Since the signal voltage Vsig supplied to the second pixel 10*f* is lower than the signal voltage Vsig supplied to the first pixel 10*n*, a decrease in the gate-source voltage Vgs of the drive transistor 12 can be suppressed. As a result, in the second pixel 10*f*, a decrease in luminance due to IR drop can be suppressed.

[Luminance Change Depending on In-Plane Position of Display Surface]

Figure 8:
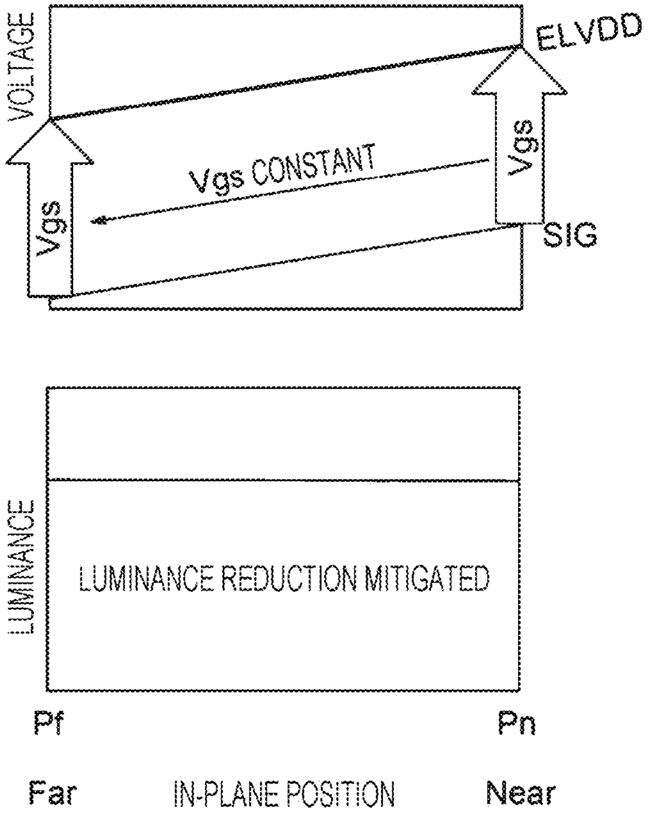
FIG. 8 is a diagram illustrating in-plane position changes of a gate-source voltage and luminance in the display device according to the first embodiment.

FIG. 8 is a diagram illustrating in-plane position changes of the gate-source voltage Vgs and the luminance in the display device 1 according to the first embodiment. Note that the in-plane position in FIG. 8 indicates the position in the left-right direction of the pixel unit 20 illustrated in FIGS. 2, 3, and 5. The upper part of FIG. 8 is a graph illustrating the relationship between the gate-source voltage Vgs and the in-plane position. In the upper graph of FIG. 8, the vertical axis represents the gate-source voltage Vgs, and the horizontal axis represents the in-plane position. The lower part of FIG. 8 is a graph illustrating the relationship between the luminance and the in-plane position. In the lower graph of FIG. 8, the vertical axis represents luminance, and the horizontal axis represents an in-plane position. Note that the in-plane position indicated by the horizontal axis is common between the two graphs illustrated in the upper part and the lower part of FIG. 8.

As illustrated in the upper part of FIG. 8, the power supply voltage changes linearly between a position Pn close to the IO pad and a position Pf far from the IO pad 60 by IR drop. That is, as described in FIG. 3, the power supply voltage linearly decreases from the position Pn to the position Pf by the IR drop.

The signal voltage Vsig decreases linearly from the position Pn to the position Pf so as to follow the power supply voltage.

As illustrated in FIG. 5, one (first gradation voltage generation circuit 40A) of the two gradation voltage generation circuits 40 supplies the first gradation voltages VG0A to VG255A to the gradation voltage supply wiring 411 from the first supply position on the gradation voltage supply wiring 411. In the example illustrated in FIG. 5, the first supply position is a right end of the gradation voltage supply wiring 411. The other (second gradation voltage generation circuit 40B) of the two gradation voltage generation circuits 40 supplies the second gradation voltages VG0B to VG255B to the gradation voltage supply wiring 411 from the second supply position on the gradation voltage supply wiring 411. In the example illustrated in FIG. 5, the second supply position is a left end of the gradation voltage supply wiring 411.

The voltage of the gradation voltage supply wiring 411 located between the first supply position and the second supply position has a voltage level between the first gradation voltages VG0A to VG255A and the second gradation voltages VG0B to VG255B. That is, the gradation voltage applied to the gradation voltage supply wiring 411 is divided to a voltage level between the first gradation voltages VG0A to VG255A and the second gradation voltages VG0B to VG255B by the wiring resistance (resistor 412) of the gradation voltage supply wiring 411. As a result, the gradation voltage to be linearly interpolated is applied to the gradation voltage supply wiring 411 at the position between the position Pn and the position Pf. In addition, a signal voltage Vsig linearly interpolated between the position Pn and the position Pf is generated by linear interpolation of the gradation voltage. Note that, since the resistance value of the resistor 412 is usually substantially uniform, the signal voltage Vsig changes linearly.

As illustrated in the upper part of FIG. 8, the signal voltage Vsig linearly changes from the position Pn to the position Pf so as to follow the power supply voltage. Therefore, the gate-source voltage Vgs is substantially constant regardless of the in-plane position of the pixel unit 20. As a result, as illustrated in the lower part of FIG. 8, the luminance becomes substantially constant regardless of the in-plane position of the pixel unit 20. As a result, it is possible to suppress a decrease in luminance and a change in luminance (shading) at an in-plane position on the display surface due to IR drop.

As described above, according to the first embodiment, the lead-out wiring 70 supplies the voltage of the power supply wiring 61 that supplies the second reference voltage to the pixel 10 to the gradation voltage generation circuit 40 as the first reference voltage (voltage VG0) so as to be used for generating the gradation voltages VG0 to VG255. This makes it possible to suppress a decrease in luminance and shading due to IR drop.

Furthermore, the size of the IR drop may change depending on the amount of light emission of the pixel 10. For example, in a high luminance mode, that is, a high display rate mode, IR drop tends to be large. By suppressing a decrease in luminance due to IR drop, the maximum luminance can be improved.

Furthermore, the organic EL element 11 may be a light emitting diode (LED) element. In this case, the display device 1 is an LED display.

In addition, the magnitude of the IR drop is proportional to the magnitude of the current passing through the outer peripheral power supply wiring 611. For example, in a case where a large current flows through the outer peripheral power supply wiring 611 as in an LED display, a decrease in luminance due to IR drop tends to be large. Therefore, it is more preferable to provide the lead-out wiring 70 to suppress a decrease in luminance.

Note that, in the first embodiment, two voltage extraction positions on the outer peripheral power supply wiring 611 are positions corresponding to the first pixel 10*n* and the second pixel 10*f*, respectively. However, the present invention is not limited thereto, and the voltage extraction position may be a position of a pixel column shifted from the pixel columns of the first pixel 10*n* and the second pixel 10*f*. That is, the two voltage extraction positions may be, for example, positions corresponding to the pixel 10 on the side closer to the IO pad 60 and the pixel 10 on the side farther from the IO pad 60 in the pixel unit 20.

In addition, in the first embodiment, a case where the digital video signal has 8 bits and 256 gradation voltages VG0 to VG255 are generated is illustrated. However, the bit depth and the number of gradations are not limited to the above example.

First Comparative Example

Figure 9:
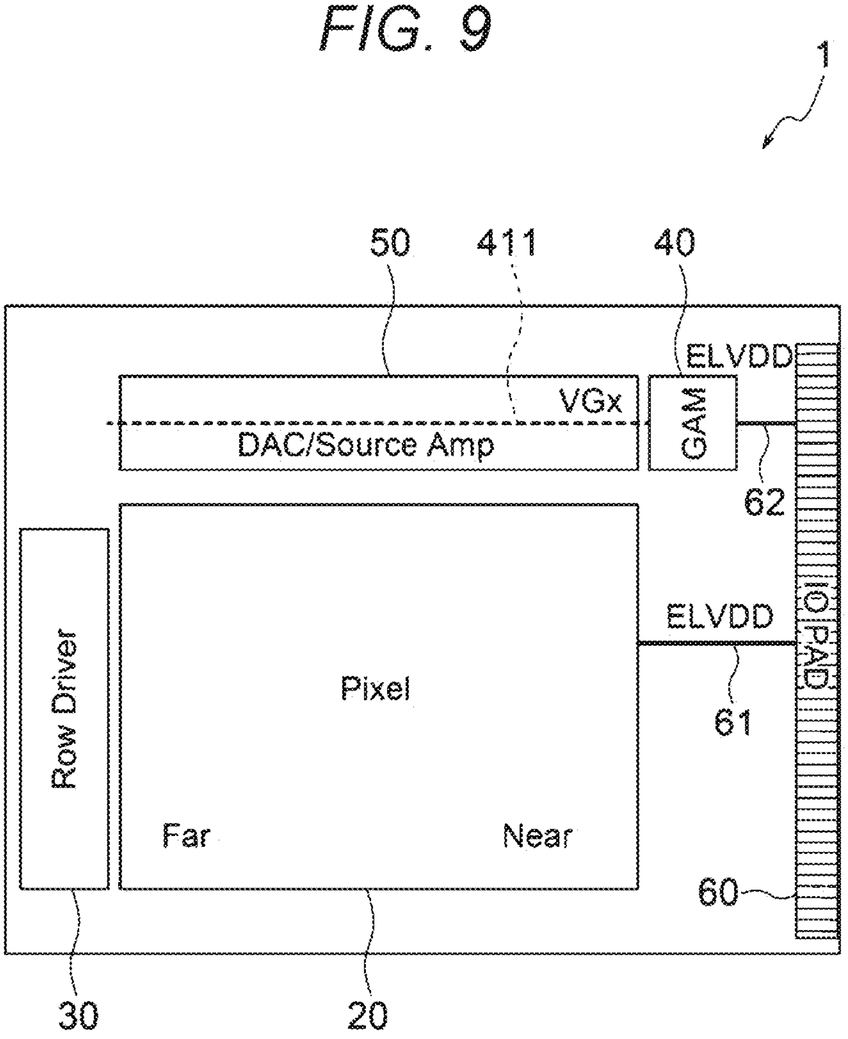
FIG. 9 is a block diagram illustrating an example of a schematic configuration of a display device according to a first comparative example.

FIG. 9 is a block diagram illustrating an example of a schematic configuration of a display device 1 according to a first comparative example. The first comparative example is different from the first embodiment in that a power supply wiring 62 is provided instead of the lead-out wiring 70.

In the example illustrated in FIG. 9, one gradation voltage generation circuit 40 and one power supply wiring 62 are provided.

The power supply wiring 62 is connected between the gradation voltage generation circuit 40 and the IO pad 60. The power supply wiring 62 supplies a second reference voltage (voltage ELVDD), which is a power supply voltage supplied from the IO pad 60 to the pixel 10, to the gradation voltage generation circuit 40 as a first reference voltage so as to be used for generating the gradation voltages VG0 to VG255.

The voltage ELVDD is directly supplied from the IO pad 60 to the gradation voltage generation circuit 40 via the power supply wiring 62. Therefore, the gradation voltage generation circuit 40 generates the gradation voltage VGx on the basis of the voltage ELVDD directly supplied from the IO pad 60.

Figure 10:
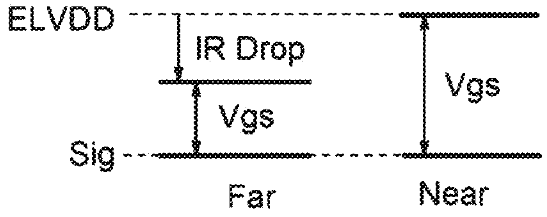
FIG. 10 is a schematic diagram illustrating a relationship between a gate-source voltage and IR drop in the display device according to the first comparative example.

FIG. 10 is a schematic diagram illustrating a relationship between the gate-source voltage Vgs and the IR drop in the display device 1 according to the first comparative example.

Similarly to FIG. 7 described with reference to the first embodiment, in the second pixel 10*f* farthest from the IO pad 60, the IR drop increases, and the power supply voltage decreases. The power supply voltage in the second pixel 10*f* is lower than the voltage ELVDD, for example. However, in the first comparative example, as illustrated in FIG. 10, the signal voltage Vsig in the second pixel 10*f* is substantially the same as the signal voltage Vsig in the first pixel 10*n*. This is because, for example, an IR drop in the gradation voltage supply wiring 411 (an IR drop in the peripheral circuit) is usually much smaller than an IR drop in the outer peripheral power supply wiring 611. Therefore, in the second pixel 10*f* farthest from the IO pad 60, the gate-source voltage Vgs decreases due to the IR drop in the outer peripheral power supply wiring 611, and the luminance decreases.

Figure 11:
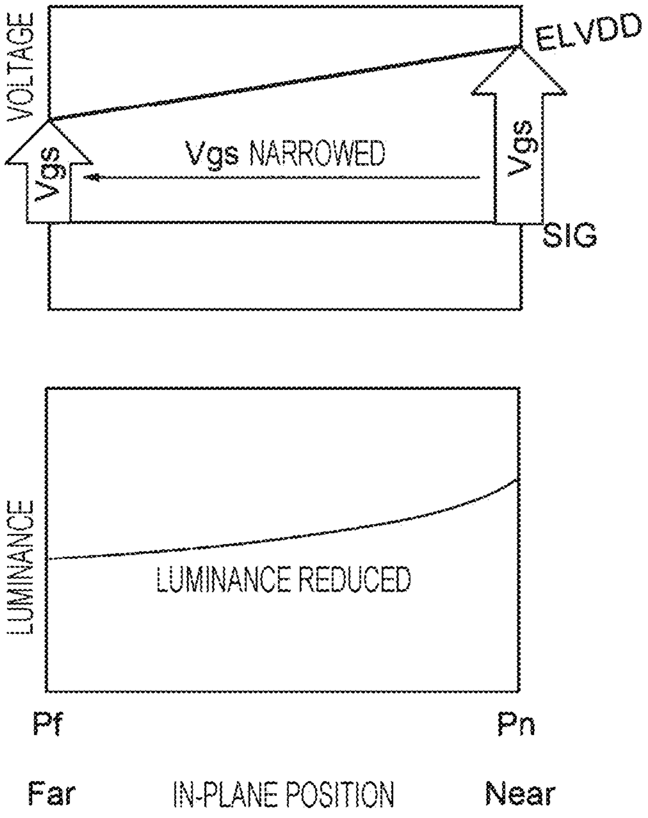
FIG. 11 is a diagram illustrating in-plane position changes of a gate-source voltage and luminance in the display device according to the first comparative example.

FIG. 11 is a diagram illustrating in-plane position changes of the gate-source voltage Vgs and the luminance in the display device 1 according to the first comparative example.

As illustrated in the upper part of FIG. 11, the magnitude of the signal voltage Vsig is substantially constant regardless of the in-plane position of the pixel unit 20. In this case, the gate-source voltage Vgs between the power supply voltage and the signal voltage Vsig is narrowed from the position Pn to the position Pf. Therefore, as illustrated in the lower part of FIG. 11, the luminance decreases from the position Pn to the position Pf. That is, shading occurs.

On the other hand, in the first embodiment, the signal voltage Vsig can be lowered to follow the power supply voltage from the position Pn to the position Pf. As a result, the gate-source voltage Vgs can be made substantially constant regardless of the in-plane position of the pixel unit 20. As a result, it is possible to suppress a decrease in luminance and shading due to IR drop.

Second Comparative Example

As a second comparative example, for example, it is also conceivable to provide a dedicated arithmetic circuit that corrects the gradation voltages VG0 to VG255 on the basis of the detected power supply voltage of the pixel 10. However, in this case, an installation area for disposing a complicated arithmetic circuit is required, and thus, for example, a scale of a peripheral circuit other than the pixel region becomes large. In addition, power consumption increases.

On the other hand, in the first embodiment, the gradation voltages VG0 to VG255 can be corrected so as to follow the change in the power supply voltage of the pixel 10 by changing the arrangement of the circuits and changing the connection (routing) of the wiring. Therefore, the gradation voltages VG0 to VG255 can be automatically corrected without requiring processing such as calculation and without improving a device, a process, and the like. As a result, it is possible to suppress a decrease in luminance due to IR drop while suppressing an increase in circuit scale (chip area) and an increase in power consumption.

First Modification of First Embodiment

Figure 12:
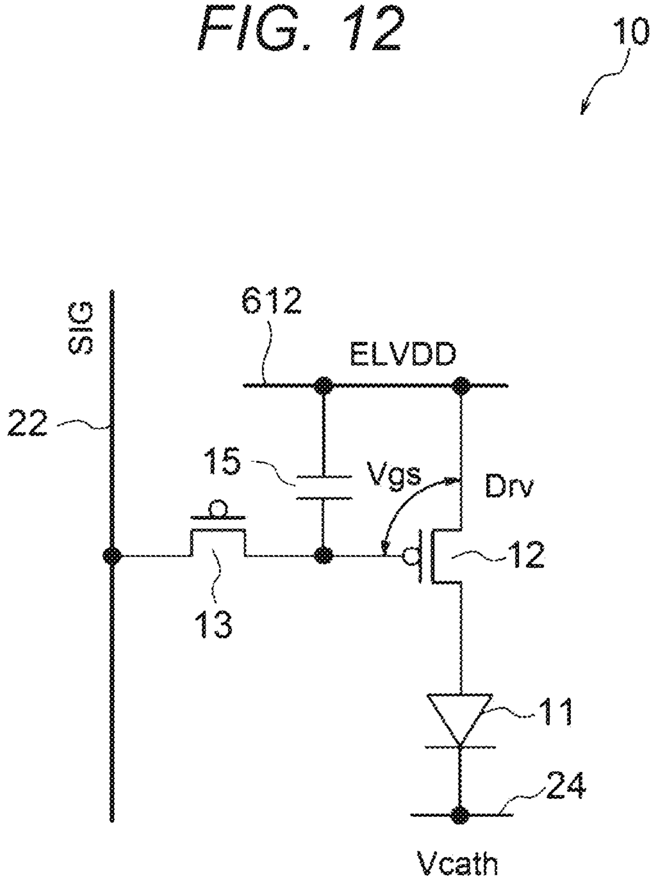
FIG. 12 is a circuit diagram illustrating an example of a configuration of a pixel (pixel circuit) in a display device according to a first modification of the first embodiment.

FIG. 12 is a circuit diagram illustrating an example of a configuration of a pixel (pixel circuit) 10 in a display device 1 according to a first modification of the first embodiment. The first modification of the first embodiment is different from the first embodiment in the configuration of the pixel circuit.

The pixel 10 illustrated in FIG. 12 is not provided with the light emission control transistor 14, the auxiliary capacitance 16, and the auto-zero transistor 17 as compared with FIG. 4 described with reference to the first embodiment.

In the first modification of the first embodiment, similarly to the first embodiment, the holding capacitance 15 is connected between the gate electrode and the source electrode of the drive transistor 12. In addition, a power supply voltage (for example, the voltage ELVDD) is supplied to the source electrode of the drive transistor 12 from the in-pixel power supply wiring 612 which is a power supply voltage node on the high potential side.

As in the first modification of the first embodiment, the configuration of the pixel circuit may be changed. In this case, effects similar to those of the first embodiment can be obtained.

Second Modification of First Embodiment

Figure 13:
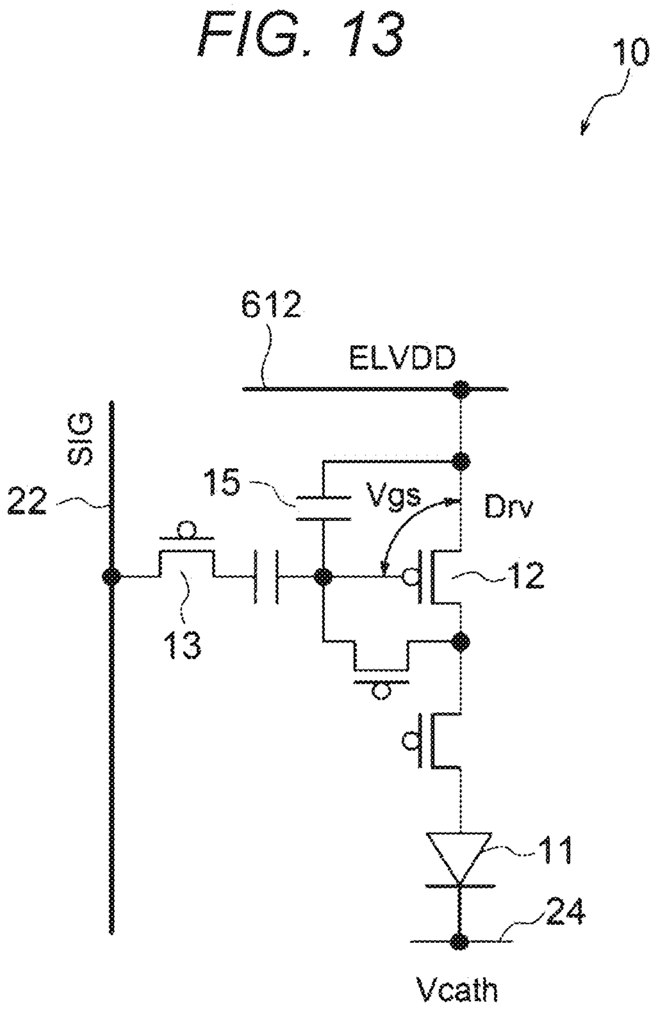
FIG. 13 is a circuit diagram illustrating an example of a configuration of a pixel (pixel circuit) in a display device according to a second modification of the first embodiment.

FIG. 13 is a circuit diagram illustrating an example of a configuration of a pixel (pixel circuit) 10 in a display device 1 according to a second modification of the first embodiment. The second modification of the first embodiment is different from the first embodiment in the configuration of the pixel circuit.

In the second modification of the first embodiment, similarly to the first embodiment, the holding capacitance 15 is connected between the gate electrode and the source electrode of the drive transistor 12. In addition, a power supply voltage (for example, the voltage ELVDD) is supplied to the source electrode of the drive transistor 12 from the in-pixel power supply wiring 612 which is a power supply voltage node on the high potential side.

As in the second modification of the first embodiment, the configuration of the pixel circuit may be changed. In this case, effects similar to those of the first embodiment can be obtained.

Third Modification of First Embodiment

Figure 14:
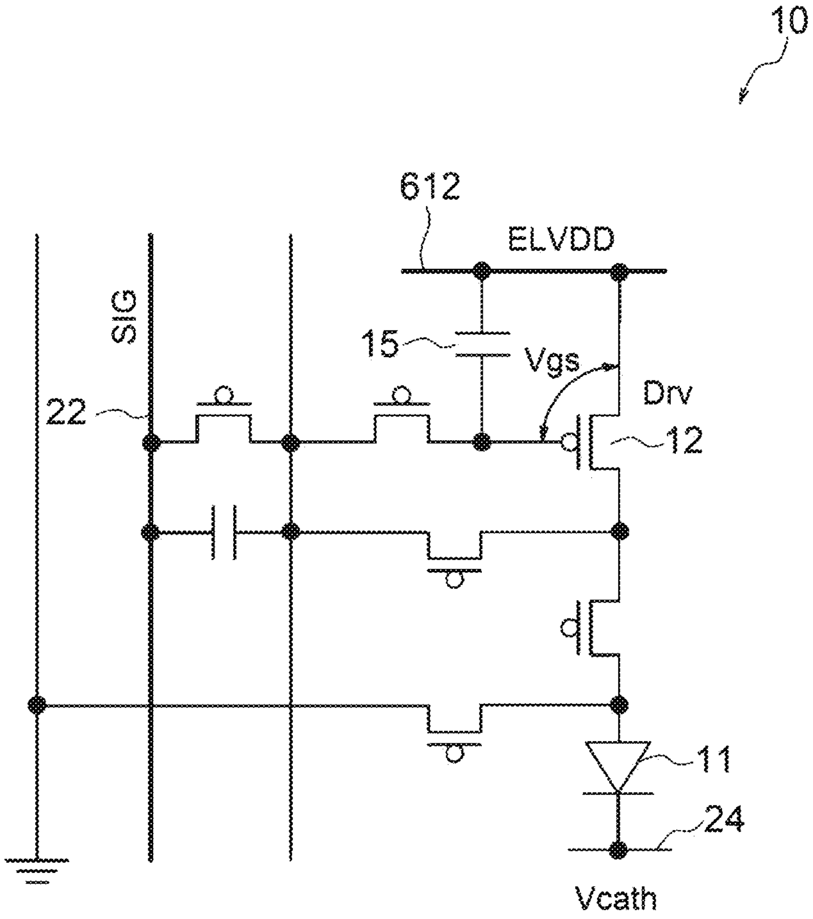
FIG. 14 is a circuit diagram illustrating an example of a configuration of a pixel (pixel circuit) in a display device according to a third modification of the first embodiment.

FIG. 14 is a circuit diagram illustrating an example of a configuration of a pixel (pixel circuit) 10 in a display device 1 according to a third modification of the first embodiment. The third modification of the first embodiment is different from the first embodiment in the configuration of the pixel circuit.

In the third modification of the first embodiment, similarly to the first embodiment, the holding capacitance 15 is connected between the gate electrode and the source electrode of the drive transistor 12. In addition, a power supply voltage (for example, the voltage ELVDD) is supplied to the source electrode of the drive transistor 12 from the in-pixel power supply wiring 612 which is a power supply voltage node on the high potential side.

As in the third modification of the first embodiment, the configuration of the pixel circuit may be changed. In this case, effects similar to those of the first embodiment can be obtained.

Fourth Modification of First Embodiment

Figure 15:
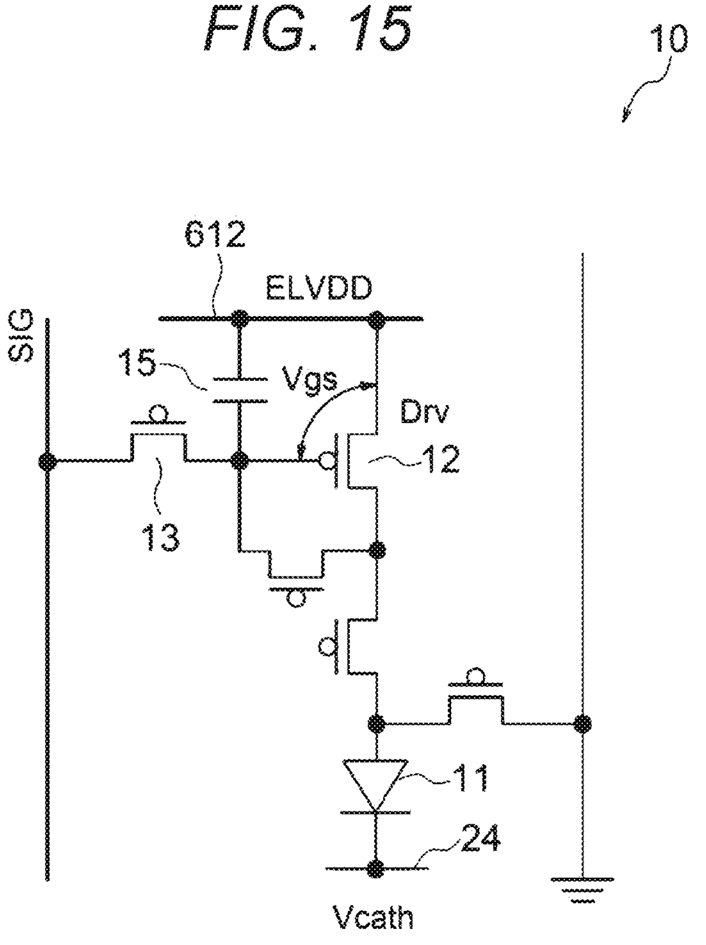
FIG. 15 is a circuit diagram illustrating an example of a configuration of a pixel (pixel circuit) in a display device according to a fourth modification of the first embodiment.

FIG. 15 is a circuit diagram illustrating an example of a configuration of a pixel (pixel circuit) 10 in a display device 1 according to a fourth modification of the first embodiment. The fourth modification of the first embodiment is different from the first embodiment in the configuration of the pixel circuit.

In the fourth modification of the first embodiment, similarly to the first embodiment, the holding capacitance 15 is connected between the gate electrode and the source electrode of the drive transistor 12. In addition, a power supply voltage (for example, the voltage ELVDD) is supplied to the source electrode of the drive transistor 12 from the in-pixel power supply wiring 612 which is a power supply voltage node on the high potential side.

As in the fourth modification of the first embodiment, the configuration of the pixel circuit may be changed. In this case, effects similar to those of the first embodiment can be obtained.

Fifth Modification of First Embodiment

Figure 16:
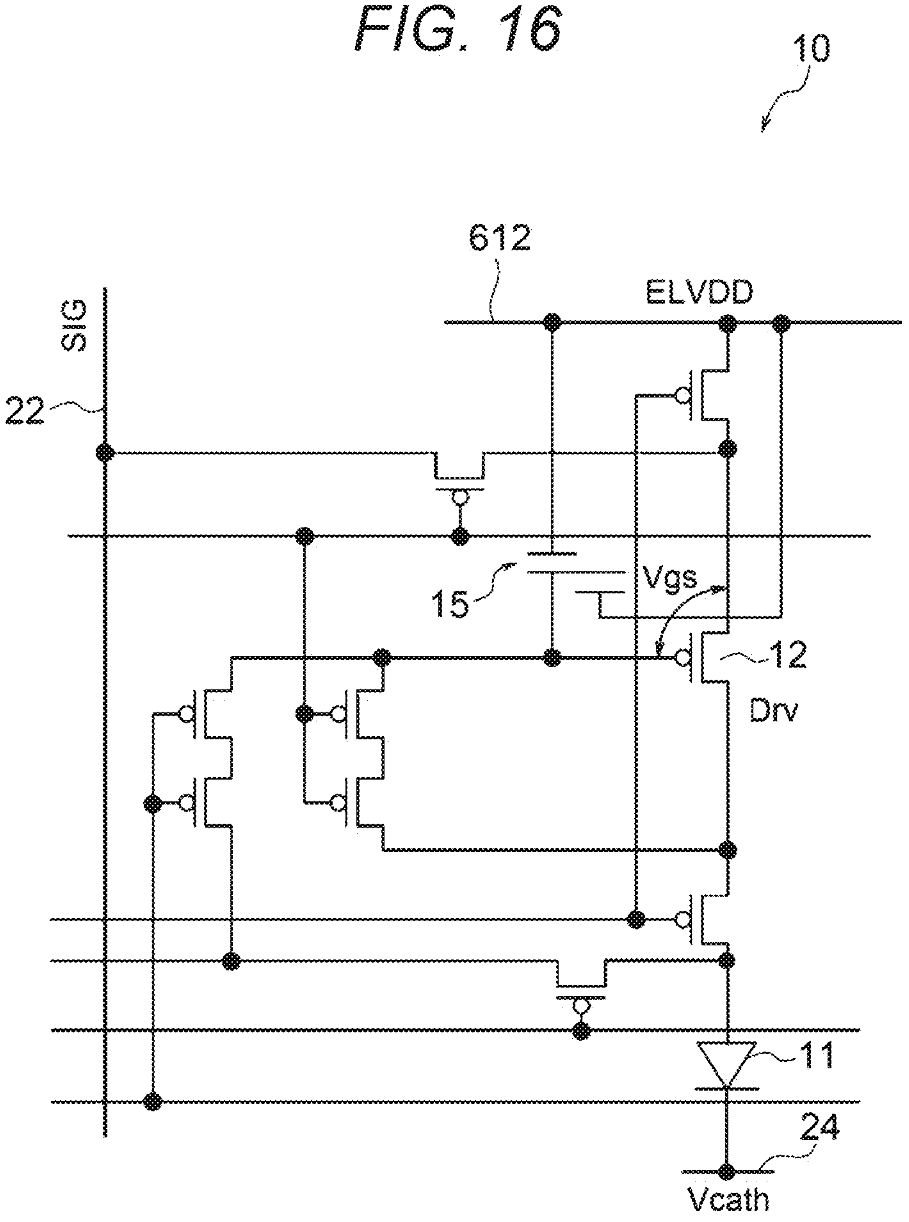
FIG. 16 is a circuit diagram illustrating an example of a configuration of a pixel (pixel circuit) in a display device according to a fifth modification of the first embodiment.

FIG. 16 is a circuit diagram illustrating an example of a configuration of a pixel (pixel circuit) 10 in a display device 1 according to a fifth modification of the first embodiment. The fifth modification of the first embodiment is different from the first embodiment in the configuration of the pixel circuit.

In the fifth modification of the first embodiment, similarly to the first embodiment, the holding capacitance 15 is connected between the gate electrode and the source electrode of the drive transistor 12. In addition, a power supply voltage (for example, the voltage ELVDD) is supplied to the source electrode of the drive transistor 12 from the in-pixel power supply wiring 612 which is a power supply voltage node on the high potential side.

As in the fifth modification of the first embodiment, the configuration of the pixel circuit may be changed. In this case, effects similar to those of the first embodiment can be obtained.

Second Embodiment

Figure 17:
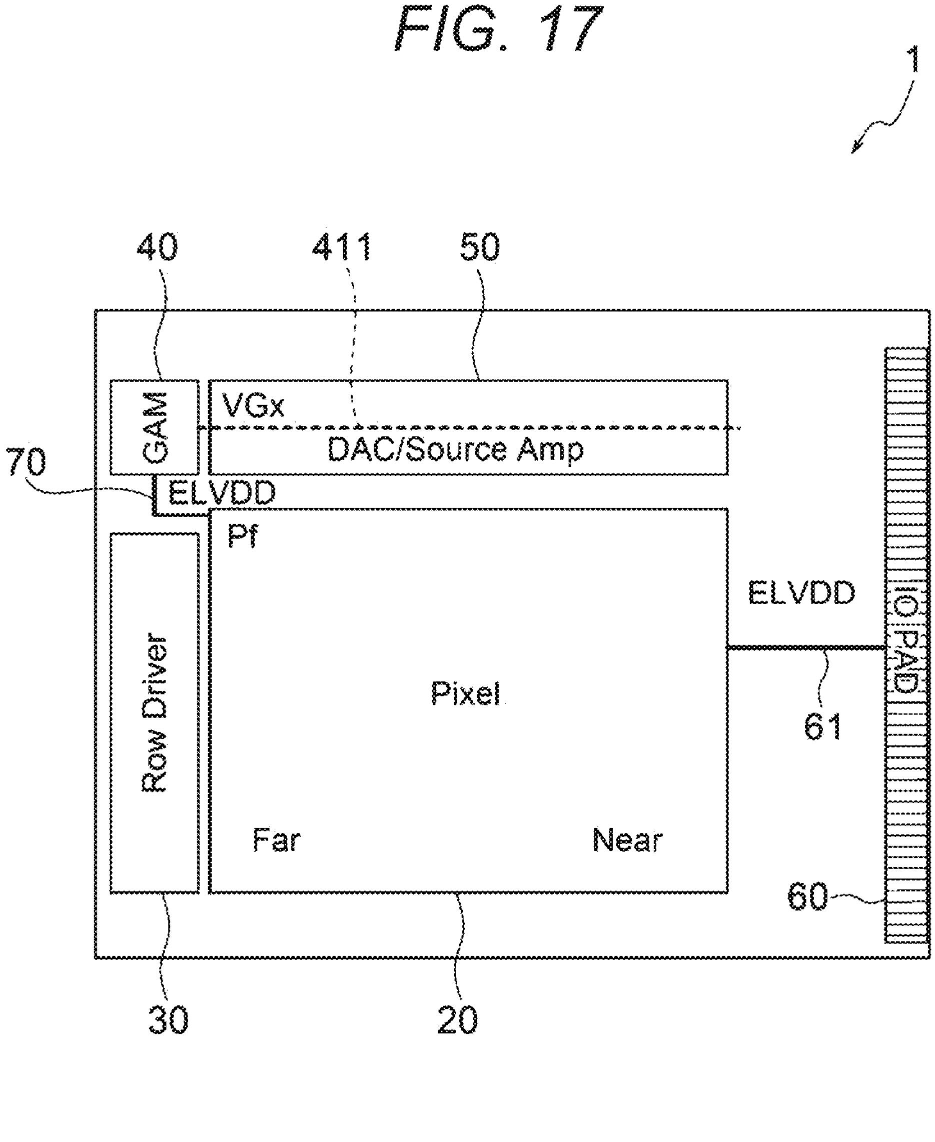
FIG. 17 is a block diagram illustrating an example of a schematic configuration of a display device according to a second embodiment.

FIG. 17 is a block diagram illustrating an example of a schematic configuration of a display device 1 according to a second embodiment. The second embodiment is different from the first embodiment in that one lead-out wiring 70 and one gradation voltage generation circuit 40 are provided.

The lead-out wiring 70 is electrically connected to the voltage lead-out position Pv on the outer peripheral power supply wiring 611 corresponding to the position of the second pixel 10*f* farthest from the IO pad 60.

The lead-out wiring 70 supplies a voltage at one voltage lead-out position Pv on the power supply wiring 61 to the gradation voltage generation circuit 40. The lead-out wiring 70 supplies a voltage (for example, the voltage ELVDD−ΔV) at the voltage lead-out position Pv on the power supply wiring 61 corresponding to the position of the second pixel 10*f* farthest from the IO pad 60 to the gradation voltage generation circuit 40.

The gradation voltage generation circuit 40 is disposed on the left side of the drive unit 50. The gradation voltage generation circuit 40 uses the voltage (for example, the voltage ELVDD−ΔV) supplied from the lead-out wiring 70 as the first reference voltage (voltage VG0) to generate 256 gradation voltages VG0 to VG255.

Here, since there is one gradation voltage generation circuit 40, the drive unit 50 supplies the signal voltage Vsig based on the gradation voltages VG0 to VG255 to all the signal lines 22 regardless of the position from the IO pad 60. Therefore, the drive unit 50 also supplies the signal voltage Vsig based on the gradation voltages VG0 to VG255 to the signal line 22 arranged at the position Pn close to the IO pad 60.

Figure 18:
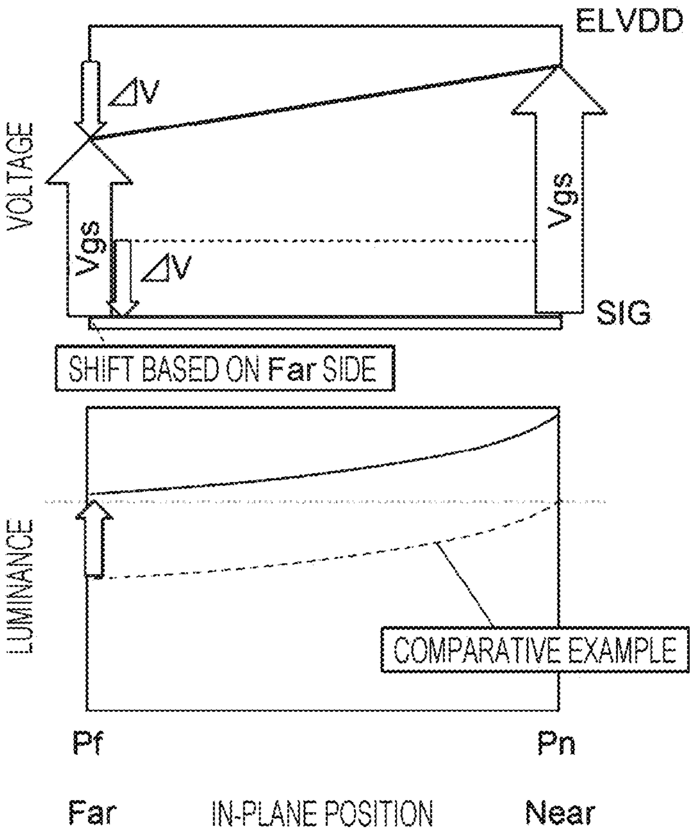
FIG. 18 is a diagram illustrating in-plane position changes of a gate-source voltage and luminance in the display device according to the second embodiment.

FIG. 18 is a diagram illustrating in-plane position changes of the gate-source voltage Vgs and the luminance in the display device 1 according to the second embodiment.

As illustrated in the upper part of FIG. 18, the signal voltage Vsig decreases according to the IR drop (for example, ΔV) of the second pixel 10*f* farthest from the IO pad 60. Furthermore, the magnitude of the signal voltage Vsig is substantially constant regardless of the in-plane position of the pixel unit 20.

In this case, similarly to the comparative example, the gate-source voltage Vgs narrows from the position Pn to the position Pf, and the luminance decreases. However, the gate-source voltage Vgs of the entire display surface is larger than that of the comparative example. Therefore, the decrease in luminance is suppressed, and the luminance can be improved in the entire display surface.

As in the second embodiment, one lead-out wiring 70 and one gradation voltage generation circuit 40 may be provided. In this case, effects similar to those of the first embodiment can be obtained. Note that the second embodiment may be combined with the first to fifth modifications of the first embodiment.

Third Embodiment

Figure 19:
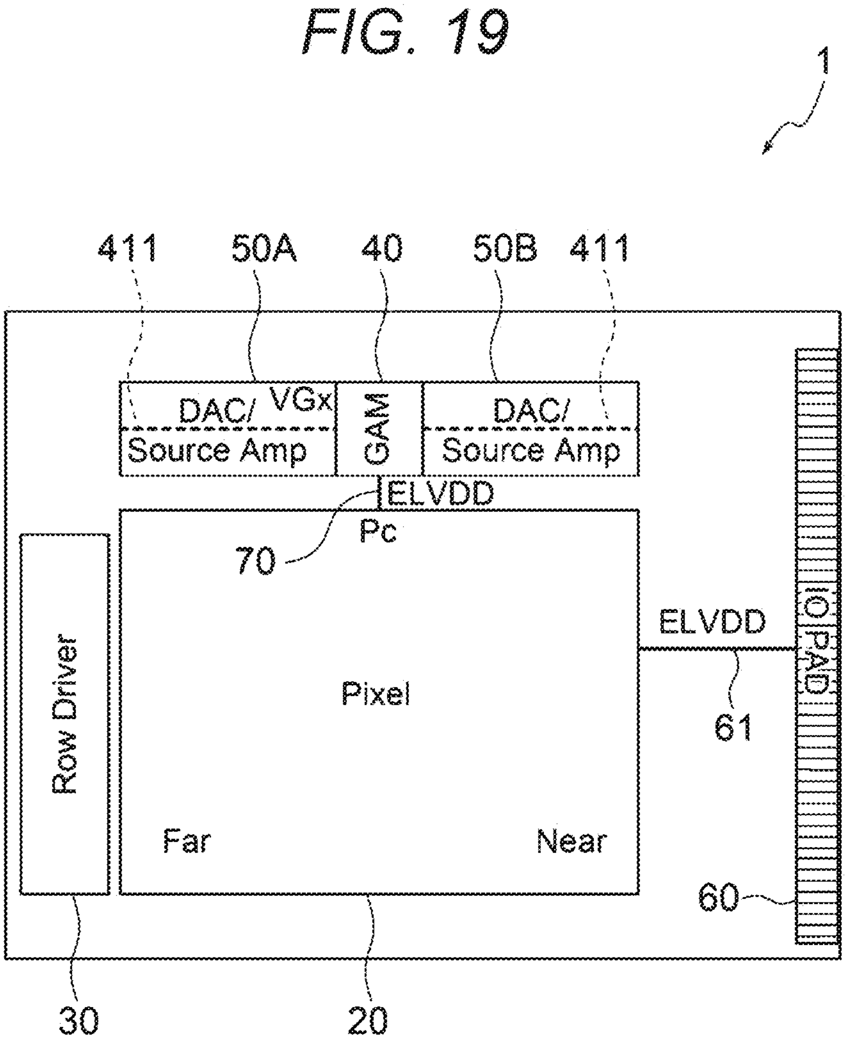
FIG. 19 is a block diagram illustrating an example of a schematic configuration of a display device according to a third embodiment.

FIG. 19 is a block diagram illustrating an example of a schematic configuration of a display device 1 according to a third embodiment. The third embodiment is different from the second embodiment in the voltage extraction position by the lead-out wiring 70 and the arrangement of the gradation voltage generation circuit 40.

The drive unit 50 is divided into two drive units 50A and 50B at substantially the center.

The lead-out wiring 70 is electrically connected to the voltage lead-out position Pv on the outer peripheral power supply wiring 611 corresponding to the position (position Pc) of the pixel 10 disposed between the first pixel 10*n* and the second pixel 10*f*. The position Pc indicates, for example, a substantially central portion (position near the center) of the pixel unit 20 (pixel region).

The lead-out wiring 70 supplies the voltage (for example, the voltage ELVDD−ΔV/2) at the voltage lead-out position Pv on the power supply wiring 61 corresponding to the position of the pixel 10 arranged between the first pixel 10*n* closest to the IO pad 60 and the second pixel 10*f* farthest from the IO pad 60 to the gradation voltage generation circuit 40.

The gradation voltage generation circuit 40 is disposed between the drive unit 50A and the drive unit 50B. The gradation voltage generation circuit 40 uses the voltage (for example, the voltage ELVDD−ΔV/2) supplied from the lead-out wiring 70 as the first reference voltage (voltage VG0) to generate 256 gradation voltages VG0 to VG255.

Figure 20:
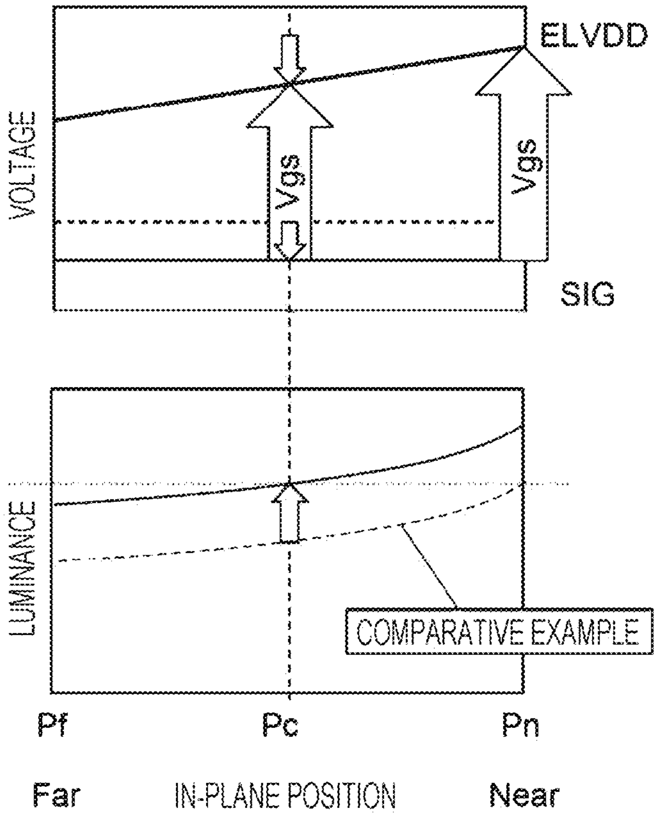
FIG. 20 is a diagram illustrating in-plane position changes of a gate-source voltage and luminance in the display device according to the third embodiment.

FIG. 20 is a diagram illustrating in-plane position changes of the gate-source voltage Vgs and the luminance in the display device 1 according to the third embodiment.

As illustrated in the upper part of FIG. 20, the signal voltage Vsig decreases according to the IR drop (for example, ΔV/2) of the pixel 10 at the position Pc. Furthermore, the magnitude of the signal voltage Vsig is substantially constant regardless of the in-plane position of the pixel unit 20.

In the third embodiment, similarly to the second embodiment, luminance can be improved over the entire display surface. Note that, in the third embodiment, improvement in luminance is small as compared with the second embodiment.

As in the third embodiment, the voltage extraction position of the lead-out wiring 70 and the arrangement of the gradation voltage generation circuit 40 may be changed. In this case, effects similar to those of the second embodiment can be obtained. Note that the third embodiment may be combined with the first to fifth modifications of the first embodiment.

Fourth Embodiment

Figure 21:
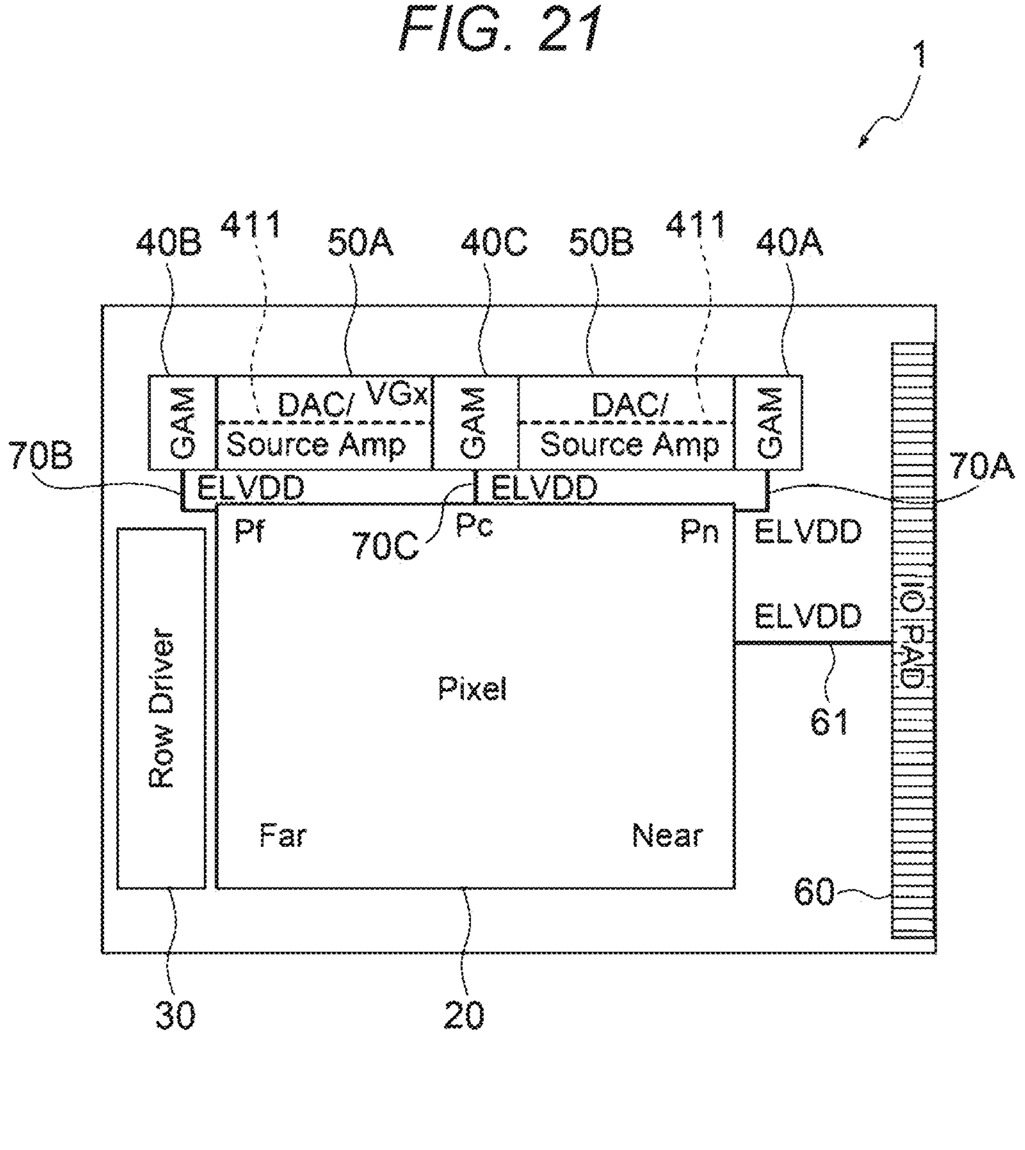
FIG. 21 is a block diagram illustrating an example of a schematic configuration of a display device according to a fourth embodiment.

FIG. 21 is a block diagram illustrating an example of a schematic configuration of a display device 1 according to a fourth embodiment. The fourth embodiment is different from the first embodiment in that three lead-out wirings 70 and three gradation voltage generation circuits 40 are provided.

The variation in the wiring resistance of the outer peripheral power supply wiring 611 illustrated in FIG. 3 is usually small. In this case, from the position Pn to the position Pf, the IR drop increases linearly, and the power supply voltage decreases linearly. However, the IR drop may change depending on, for example, the pattern of the amount of light emission (display rate) on the display surface. In this case, depending on the display pattern, the size of the IR drop may locally change greatly. As a result, the luminance may not necessarily be uniform at the in-plane position of the display surface.

Figure 22:
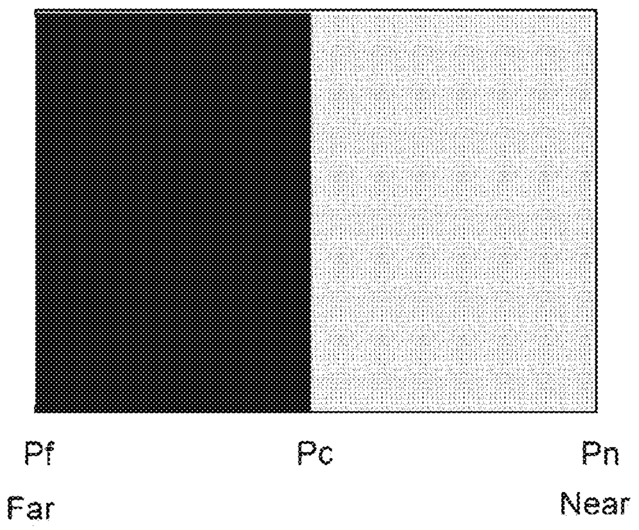
FIG. 22 is a diagram illustrating an example of a display pattern in which the amount of light emission changes in a display surface.

FIG. 22 is a diagram illustrating an example of a display pattern in which the amount of light emission changes in the display surface.

In the example illustrated in FIG. 22, the amount of light emission on the position Pn side is relatively larger than the position Pc, and the amount of light emission on the position Pf side is relatively smaller than the position Pc. That is, the amount of light emission greatly changes at the position Pc.

Therefore, as illustrated in FIG. 21, the lead-out wiring 70 and the gradation voltage generation circuit 40 are further provided. This makes it possible to more appropriately interpolate the signal voltage Vsig at the in-plane position.

The drive unit 50 is divided into two drive units 50A and 50B at substantially the center.

The lead-out wiring 70 further includes a third lead-out wiring 70C. The third lead-out wiring 70C is electrically connected to the voltage lead-out position Pv on the outer peripheral power supply wiring 611 according to the position (position Pc) of the pixel 10 arranged between the first pixel 10*n* and the second pixel 10*f*.

The third lead-out wiring 70C supplies the voltage at the voltage lead-out position Pv on the power supply wiring 61 corresponding to the position (position Pc) of the pixel 10 arranged between the first pixel 10*n* and the second pixel 10*f* to the third gradation voltage generation circuit 40C as a first reference voltage (voltage VG0C).

The gradation voltage generation circuit 40 further includes a third gradation voltage generation circuit 40C. The third gradation voltage generation circuit 40C is disposed between the first gradation voltage generation circuit 40A and the second gradation voltage generation circuit 40B.

The third gradation voltage generation circuit 40C is disposed between the drive unit 50A and the drive unit 50B. The third gradation voltage generation circuit 40C generates 256 third gradation voltages VG0C to VG255C with the voltage supplied from the third lead-out wiring 70C as a first reference voltage (voltage VG0C).

Figure 23:
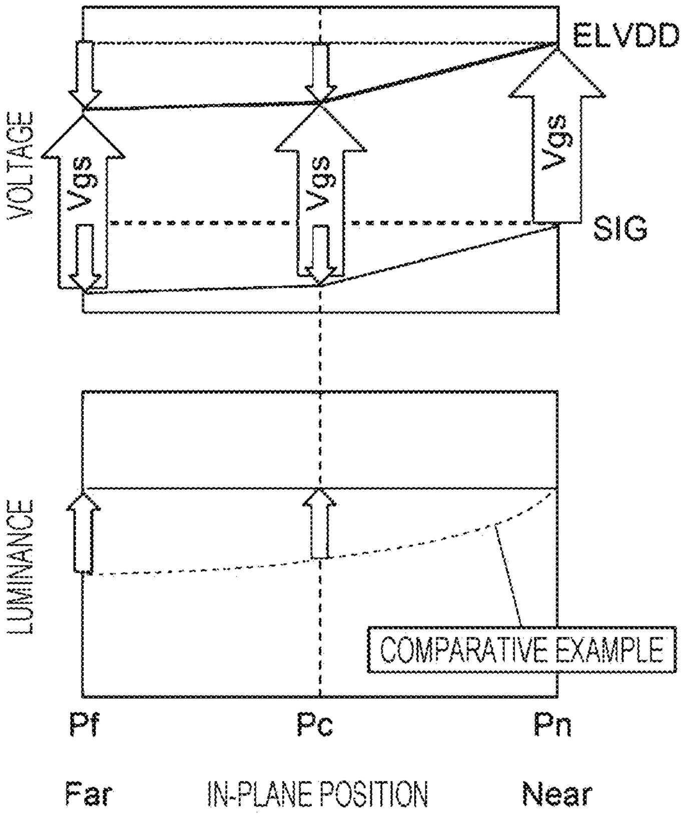
FIG. 23 is a diagram illustrating in-plane position changes of a gate-source voltage and luminance in the display device according to the fourth embodiment.

FIG. 23 is a diagram illustrating in-plane position changes of the gate-source voltage Vgs and the luminance in the display device 1 according to the fourth embodiment.

As illustrated in the upper part of FIG. 23, the power supply voltage greatly decreases from the position Pn to the position Pc, and slightly decreases from the position Pc to the position Pf. This is because, in the display pattern illustrated in FIG. 22, the pixel region with a larger amount of light emission has a larger IR drop, and the pixel region with a smaller amount of light emission has a smaller IR drop.

The third lead-out wiring 70C extracts the power supply voltage at the position Pc greatly decreased from the voltage ELVDD by the IR drop, and supplies the power supply voltage to the third gradation voltage generation circuit 40C. As described in the first embodiment, the signal voltage Vsig is linearly interpolated. For example, the signal voltage Vsig is linearly interpolated between the position Pn and the position Pc. The signal voltage Vsig is linearly interpolated between the position Pc and the position Pf.

The signal voltage Vsig greatly decreases linearly from the position Pn to the position Pc so as to follow the power supply voltage. The signal voltage Vsig linearly slightly decreases from the position Pc to the position Pf so as to follow the power supply voltage. That is, the signal voltage Vsig follows the power supply voltage over the entire display surface.

As illustrated in the upper part of FIG. 23, since the signal voltage Vsig changes so as to follow the power supply voltage, the gate-source voltage Vgs becomes substantially constant regardless of the in-plane position of the pixel unit 20. As a result, as illustrated in the lower part of FIG. 23, the luminance becomes substantially constant regardless of the in-plane position of the pixel unit 20. As a result, shading due to IR drop can be suppressed.

In the fourth embodiment, the signal voltage Vsig can be changed so as to follow a local change in the power supply voltage. This makes it possible to suppress a local fluctuation in luminance. As a result, for example, it is possible to further suppress a decrease in the uniformity of the image quality with respect to the display pattern in which the display rate is biased in the display surface.

In addition, four or more lead-out wirings 70 and four or more gradation voltage generation circuits 40 may be provided. As the number of lead-out wirings 70 and the number of gradation voltage generation circuits 40 increase, a local fluctuation in luminance can be further suppressed.

As in the fourth embodiment, three lead-out wirings 70 and three gradation voltage generation circuits 40 may be provided. In this case, effects similar to those of the first embodiment can be obtained. Note that the fourth embodiment may be combined with the first to fifth modifications of the first embodiment.

Fifth Embodiment

Figure 24:
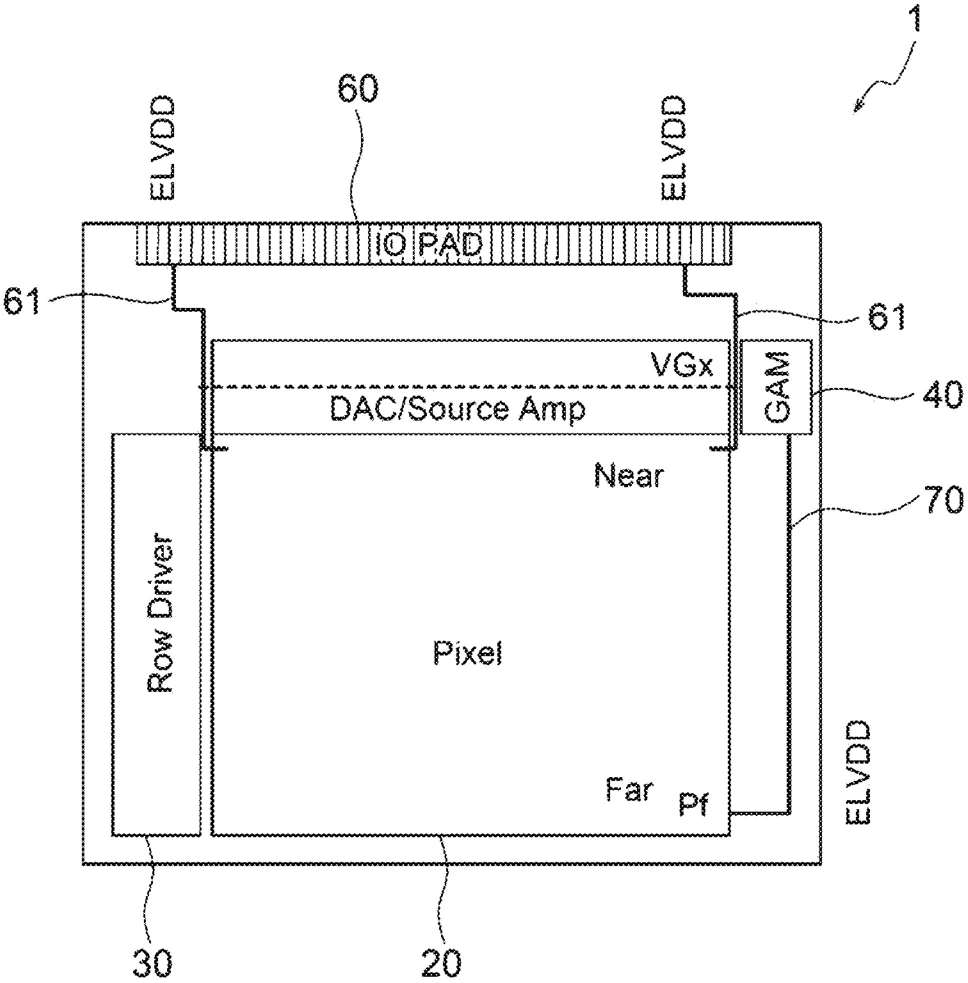
FIG. 24 is a block diagram illustrating an example of a schematic configuration of a display device according to a fifth embodiment.

FIG. 24 is a block diagram illustrating an example of a schematic configuration of a display device 1 according to a fifth embodiment. The fifth embodiment is different from the second embodiment in the position of the IO pad 60.

The pixel unit 20 (pixel region) and the IO pad 60 are arranged side by side in the supply direction of the signal voltage Vsig to the pixel 10. The supply direction of the signal voltage Vsig is the up-down direction in FIG. 24.

In the example illustrated in FIG. 24, the IO pad 60 is disposed above the drive unit 50 on the paper. The two power supply wirings 61 supply a power supply voltage (for example, the voltage ELVDD) from the upper side of the pixel unit 20. Therefore, in the fifth embodiment, the position Pn is on the upper side of the pixel unit 20, and the position Pf is on the lower side of the pixel unit 20. The first pixel 10*n* includes, for example, a plurality of pixels 10 in a pixel row closest to the IO pad 60. The second pixel 10*f* includes, for example, a plurality of pixels 10 in a pixel row farthest from the IO pad 60.

Similarly to the second embodiment, the lead-out wiring 70 is electrically connected to the voltage lead-out position Pv on the outer peripheral power supply wiring 611 corresponding to the position of the second pixel 10*f* farthest from the IO pad 60.

The lead-out wiring 70 supplies a voltage (for example, the voltage ELVDD−ΔV) at the voltage lead-out position Pv on the power supply wiring 61 corresponding to the position of the second pixel 10*f* to the gradation voltage generation circuit 40 as a first reference voltage (voltage VG0).

The gradation voltage generation circuit 40 is disposed on the right side of the drive unit 50. The gradation voltage generation circuit 40 uses the voltage (for example, the voltage ELVDD−ΔV) supplied from the lead-out wiring 70 as the first reference voltage (voltage VG0) to generate 256 gradation voltages VG0 to VG255.

As described with reference to FIG. 7, the drive unit 50 supplies the signal voltage Vsig based on the gradation voltages VG0 to VG255 to all the signal lines 22. Note that, in the fifth embodiment, the pixel unit 20 and the IO pad 60 are arranged side by side along the extending direction of the signal line 22. Therefore, one signal line 22 supplies the signal voltage Vsig not only to the first pixel 10*n* closest to the IO pad 60 but also to the second pixel 10*f* farthest from the IO pad 60.

Figure 25:
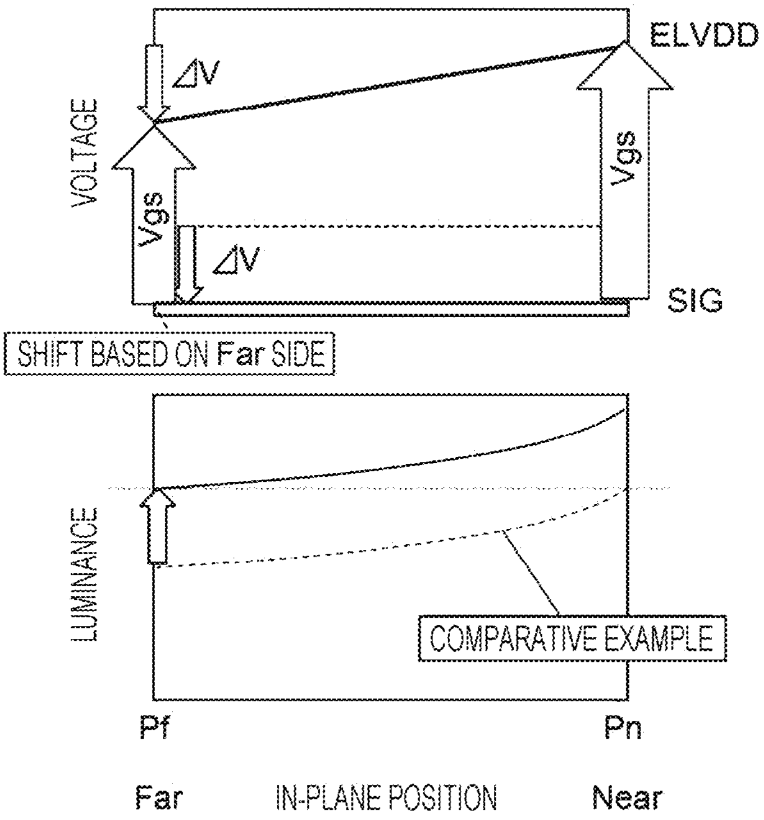
FIG. 25 is a diagram illustrating in-plane position changes of a gate-source voltage and luminance in the display device according to the fifth embodiment.

FIG. 25 is a diagram illustrating in-plane position changes of the gate-source voltage Vgs and the luminance in the display device 1 according to the fifth embodiment. Note that the in-plane position in FIG. 25 indicates the position in the up-down direction of the pixel unit 20 illustrated in FIG. 24.

FIG. 25 is substantially similar to the second embodiment described with reference to FIG. 18 except for the direction of the in-plane position.

As in the fifth embodiment, the position of the IO pad 60 may be changed. In this case, effects similar to those of the second embodiment can be obtained. Note that the fifth embodiment may be combined with the first to fifth modifications of the first embodiment. Further, the lead-out wiring 70 may lead out the power supply voltage of the pixel 10 at the position Pc instead of the position Pf. That is, the third embodiment may be combined with the fifth embodiment.

Sixth Embodiment

Figure 26:
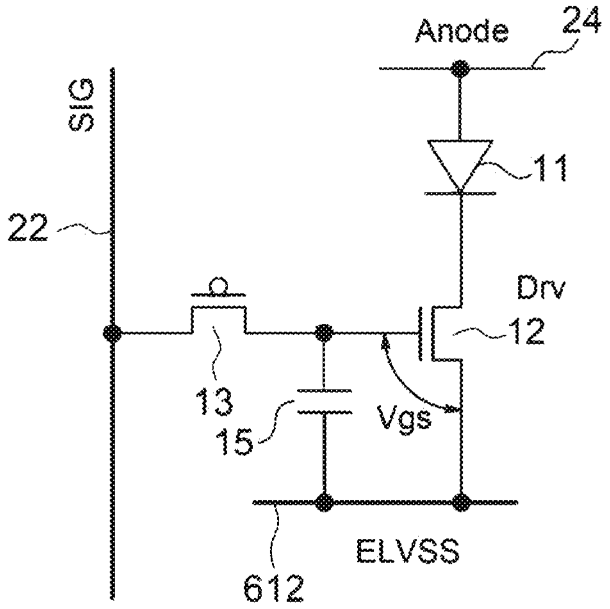
FIG. 26 is a circuit diagram illustrating an example of a configuration of a pixel (pixel circuit) in a display device according to a sixth embodiment.

FIG. 26 is a circuit diagram illustrating an example of a configuration of a pixel (pixel circuit) 10 in a display device 1 according to a sixth embodiment. The sixth embodiment is different from the first embodiment in the conductivity type of the drive transistor 12.

In the organic EL element 11, an anode electrode is connected to a common power supply wiring 24 wired in common for all the pixels 10.

The drive circuit that drives the organic EL element 11 includes a drive transistor 12, a sampling transistor 13, and a holding capacitance 15. An N-channel transistor is used as the drive transistor 12. Therefore, to the source electrode of the drive transistor 12, a power supply voltage (for example, the voltage ELVSS) is supplied from the in-pixel power supply wiring 612 which is a power supply voltage node on the low potential side. Furthermore, in the present circuit example, an N-channel transistor is also used for the sampling transistor 13, similarly to the drive transistor 12.

In the example illustrated in FIG. 26, the second reference voltage (reference voltage), which is the power supply voltage supplied to the pixel 10, is the power supply voltage on the low potential side (negative electrode side) supplied to the pixel 10. At the time of light emission of the pixel 10, the power supply voltage (for example, the voltage ELVSS) on the low potential side affects the gate-source voltage Vgs of the drive transistor 12, that is, the luminance of the pixel 10.

In a case where the drive transistor 12 is an N-channel transistor, the power supply voltage on the low potential side increases from the position Pn to the position Pf by IR drop.

Figure 27:
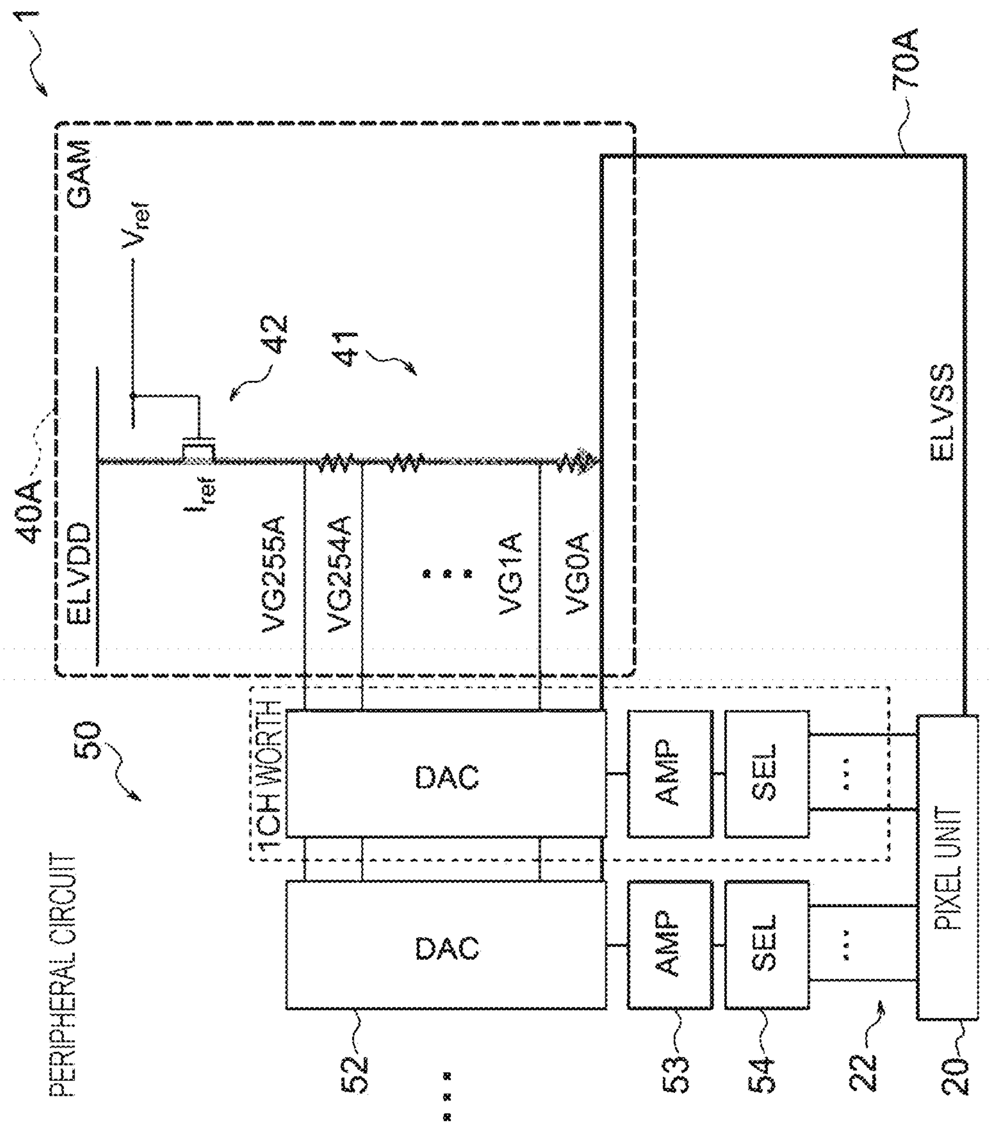
FIG. 27 is a circuit diagram illustrating an example of a configuration of a first gradation voltage generation circuit according to the sixth embodiment and its periphery.

FIG. 27 is a circuit diagram illustrating an example of a configuration of a first gradation voltage generation circuit 40A according to the sixth embodiment and its periphery.

The first lead-out wiring 70A supplies a voltage (for example, the voltage ELVSS) at the voltage lead-out position Pv on the outer peripheral power supply wiring 611 corresponding to the position of the first pixel 10*n* as a first reference voltage (voltage VG0A) to the first gradation voltage generation circuit 40A.

The first gradation voltage generation circuit 40A generates 256 first gradation voltages VG0A to VG255A using a voltage (for example, the voltage ELVSS) supplied from the first lead-out wiring 70A as a first reference voltage (voltage VG0A). Note that the voltage VG0A is the lowest voltage among the first gradation voltages VG0A to VG255A.

The ladder resistance circuit 41 is configured to be connected in series between a first power supply (low potential side power supply, in the sixth embodiment, power supply voltage node ELVSS) and a second power supply (high potential side power supply, in the sixth embodiment, the power supply voltage node ELVDD). In the example illustrated in FIG. 26, the first power supply is electrically connected to the first lead-out wiring 70A. Each of the power supply voltage nodes ELVSS of the first power supply becomes a first reference voltage (voltage VG0A illustrated in FIG. 26) of the first gradation voltage generation circuit 40A (ladder resistance circuit 41). The ladder resistance circuit 41 generates first gradation voltages VG0A to VG255A by resistance voltage division. Here, the resistance value of each resistor of the ladder resistance circuit 41 is determined according to, for example, the gamma characteristic of the pixel unit 20. In addition, the power supply on the low potential side of the ladder resistance circuit 41 is common to the power supply voltage node (for example, the power supply voltage node ELVSS) on the low potential side of the pixel (pixel circuit) 10.

Note that, since the second lead-out wiring 70B functions substantially similarly to the first lead-out wiring 70A, the description thereof will be omitted. The second gradation voltage generation circuit 40B functions substantially similarly to the first gradation voltage generation circuit 40A, and thus description thereof is omitted.

As in the sixth embodiment, the conductivity type of the drive transistor 12 may be changed, and the power supply voltage of the pixel 10 drawn back to the first gradation voltage generation circuit 40A and the second gradation voltage generation circuit 40B may be changed. In this case, effects similar to those of the first embodiment can be obtained. Note that the sixth embodiment may be combined with the second to fifth embodiments, or may be combined with the first to fifth modifications of the first embodiment.

Seventh Embodiment

Figure 28:
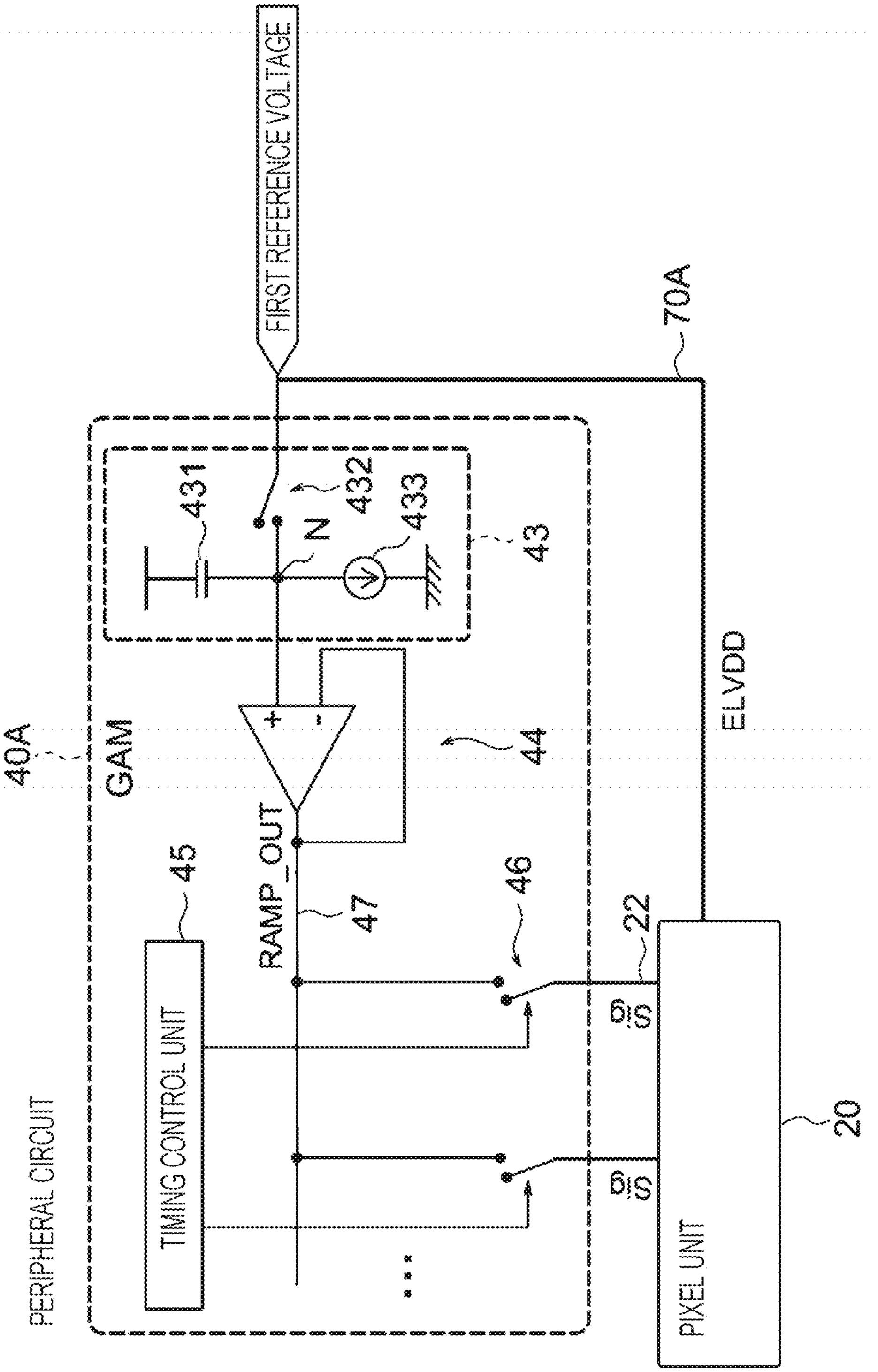
FIG. 28 is a circuit diagram illustrating an example of a configuration of a first gradation voltage generation circuit according to a seventh embodiment and its periphery.

FIG. 28 is a circuit diagram illustrating an example of a configuration of a first gradation voltage generation circuit 40A according to the seventh embodiment and its periphery. The seventh embodiment is different from the first embodiment in configurations of a first gradation voltage generation circuit 40A and a second gradation voltage generation circuit 40B.

The first gradation voltage generation circuit 40A generates a gradation voltage by a ramp waveform method. The first gradation voltage generation circuit 40A includes a ramp wave voltage generation unit 43, a voltage follower 44, a timing control unit 45, and a timing switch 46.

The ramp wave voltage generation unit 43 generates a ramp wave voltage whose voltage level changes with time on the basis of the first reference voltage. The ramp wave voltage generation unit 43 includes a capacitance 431, a voltage supply switch 432, and a constant current source 433.

The capacitance 431 is connected between the node N and the high-potential-side power supply node. The capacitance 431 holds the voltage (for example, the voltage ELVDD) drawn back from the first lead-out wiring 70A.

The voltage supply switch 432 is connected between the node N and the lead-out wiring 70. When the voltage supply switch 432 is turned on, the voltage (for example, the voltage ELVDD) drawn back from the first lead-out wiring 70A is written into the capacitance 431.

The constant current source 433 is connected between the node N and the ground. When the constant current source 433 is driven, the capacitance 431 is discharged at a constant current. As a result, a ramp wave voltage having a substantially constant slope with the lapse of time is generated.

The voltage follower 44 is connected between the node N and the ramp wiring (RAMP_OUT) 47. The voltage follower 44 outputs the ramp wave voltage to the ramp wiring 47.

The timing control unit 45 generates the gradation voltage by controlling the timing of supplying the ramp wave voltage on the basis of the luminance of the plurality of pixels 10. More specifically, the timing control unit 45 controls the timing switch at a timing corresponding to the luminance of the plurality of pixels 10. That is, the timing control unit 45 receives the digital video signal, and controls the plurality of timing switches 46 at a timing corresponding to the digital video signal. The timing control unit 45 selects the signal voltage Vsig corresponding to the gradation at the timing of turning off the timing switch 46.

The plurality of timing switches 46 is connected between the ramp wiring 47 and each of the plurality of signal lines 22. The timing switch 46 is controlled by the timing control unit 45, and outputs the signal voltage Vsig to the signal line 22.

Note that, since the second lead-out wiring 70B functions substantially similarly to the first lead-out wiring 70A, the description thereof will be omitted. The second gradation voltage generation circuit 40B functions substantially similarly to the first gradation voltage generation circuit 40A, and thus description thereof is omitted.

Figure 29:
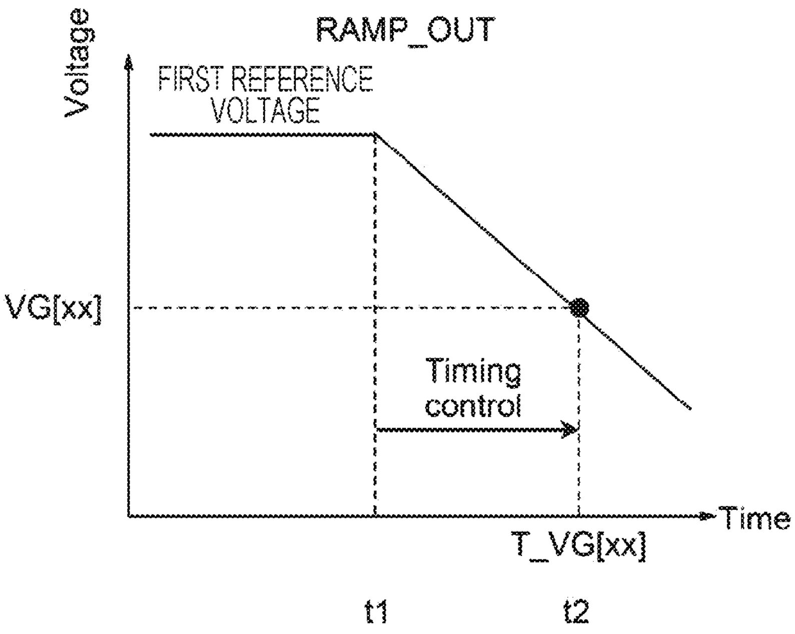
FIG. 29 is a graph illustrating an example of a voltage of a ramp wiring in a first gradation voltage generation circuit according to the seventh embodiment.

FIG. 29 is a graph illustrating an example of the voltage of the ramp wiring 47 in the first gradation voltage generation circuit 40A according to the seventh embodiment. In the graph illustrated in FIG. 29, the vertical axis represents voltage and the horizontal axis represents time.

In the initial state, the voltage of the ramp wiring 47 is the first reference voltage (for example, the voltage ELVDD) supplied by the first lead-out wiring 70A. In addition, the timing switch 46 is in an on state.

Next, at time t1, the constant current source 433 operates. As a result, as illustrated in FIG. 29, a transient waveform by the constant current source 433 is obtained. That is, the voltage of the ramp wiring 47 decreases at a substantially constant slope.

Next, at time t2, the timing control unit 45 turns off the timing switch 46. A predetermined gradation voltage VG [xx] is selected at a predetermined timing T_VG [xx] at which the timing switch 46 is turned off. As a result, the signal voltage Vsig corresponding to the digital video signal is supplied to the signal line 22.

As in the seventh embodiment, the configurations of the first gradation voltage generation circuit 40A and the second gradation voltage generation circuit 40B may be changed. In this case, effects similar to those of the first embodiment can be obtained. Note that the seventh embodiment may be combined with the second to sixth embodiments, or may be combined with the first to fifth modifications of the first embodiment.

<Application Examples of Display Device 1 and Electronic Apparatus According to Present Disclosure>

First Application Example

Figure 30A:
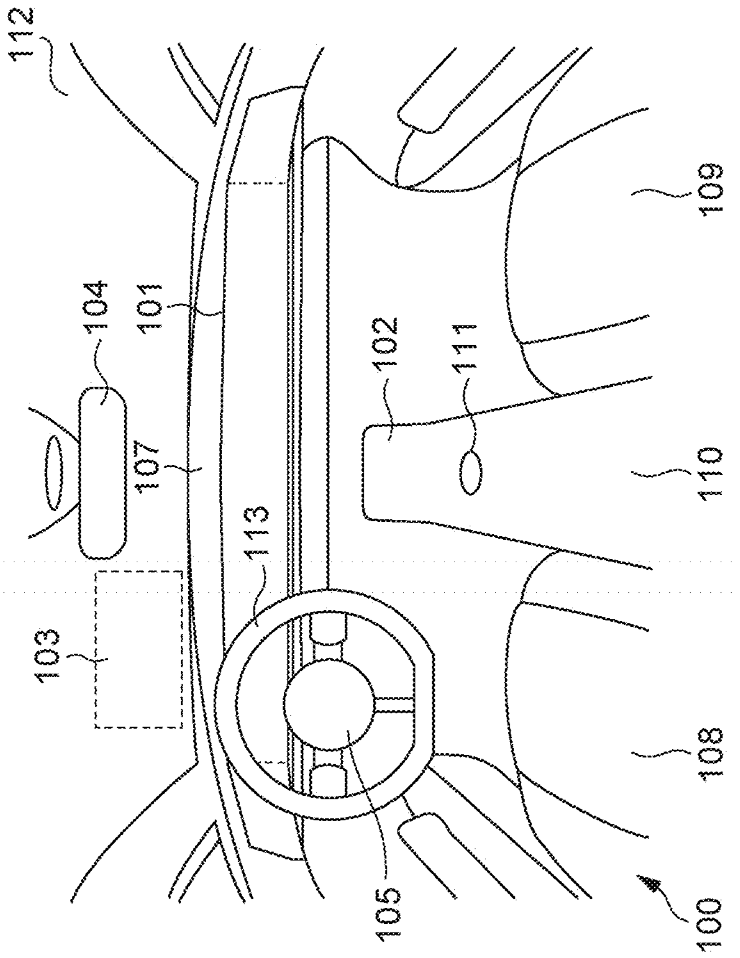
FIG. 30A is a view illustrating an internal state of a vehicle as viewed from a rear side to a front side of the vehicle.

The display device 1 according to the present disclosure can be mounted on various electronic apparatuses. FIGS. 30A and 30A are views illustrating an internal configuration of a vehicle 100 as a first application example of the electronic apparatus including the display device 1 according to the present disclosure. FIG. 30A is a view illustrating an internal state of the vehicle 100 as viewed from a rear side to a front side of the vehicle 100, and FIG. 30B is a view illustrating an internal state of the vehicle 100 as viewed from an oblique rear side to an oblique front side of the vehicle 100.

Figure 30B:
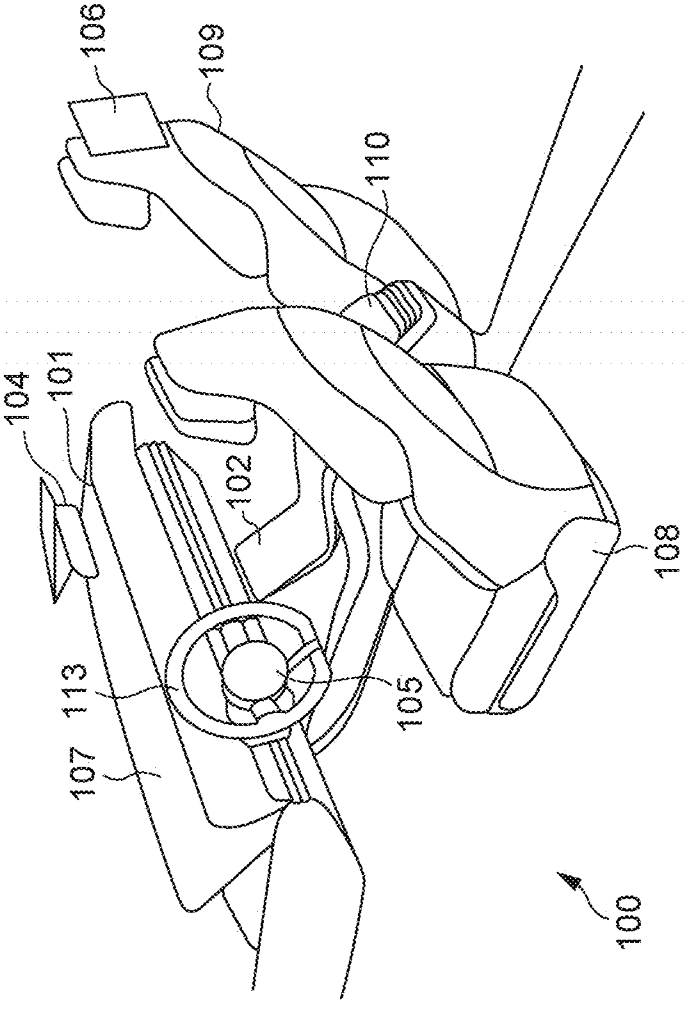
FIG. 30B is a view illustrating an internal state of a vehicle as viewed from an oblique rear side to an oblique front side of the vehicle.

The vehicle 100 in FIGS. 30A and 30B includes a center display 101, a console display 102, a head-up display 103, a digital rear mirror 104, a steering wheel display 105, and a rear entertainment display 106.

The center display 101 is arranged on a dashboard 107 at a location facing a driver seat 108 and a passenger seat 109. FIGS. 30A and 30B illustrate an example of the center display 101 having a horizontally long shape extending from the driver seat 108 side to the passenger seat 109 side, but any screen size and arrangement location of the center display 101 may be adopted. The center display 101 can display information sensed by the various sensors. As a specific example, the center display 101 can display a captured image captured by an image sensor, an image of a distance to an obstacle in front of or on a side of the vehicle, the distance being measured by a ToF sensor, a passenger's body temperature detected by an infrared sensor, and the like. The center display 101 can be used to display, for example, at least one of safety-related information, operation-related information, a life log, health-related information, authentication/identification-related information, or entertainment-related information.

The safety-related information is information of doze sensing, looking-away sensing, sensing of mischief of a child riding together, presence or absence of wearing of a seat belt, sensing of leaving of an occupant, and the like, and is information sensed by the sensor arranged to overlap with a back surface side of the center display 101, for example. The operation-related information senses a gesture related to an operation by the occupant by using the sensor. The sensed gestures may include an operation of various types of equipment in the vehicle 100. For example, operations of air conditioning equipment, a navigation device, an audiovisual (AV) device, a lighting device, and the like are detected. The life log includes life logs of all the occupants. For example, the life log includes an action record of each occupant in the vehicle. By acquiring and storing the life log, it is possible to check a state of the occupant at a time of an accident. In the health-related information, the health condition of the occupant is estimated on the basis of the body temperature of the occupant detected by using a temperature sensor. Alternatively, the face of the occupant may be imaged by using an image sensor, and the health condition of the occupant may be estimated from the imaged facial expression. Further, a conversation may be made with an occupant in automatic voice, and the health condition of the occupant may be estimated on the basis of the contents of a response from the occupant. The authentication/identification-related information includes a keyless entry function of performing face authentication using a sensor, a function of automatically adjusting a seat height and position through face identification, and the like. The entertainment-related information includes a function of detecting, with a sensor, operation information about an AV device being used by an occupant, a function of recognizing the face of the occupant with sensor and providing content suitable for the occupant through the AV device, and the like.

The console display 102 can be used, for example, to display the life log information. The console display 102 is disposed near a shift lever 111 of a center console 110 between the driver seat 108 and the passenger seat 109. The console display 102 can also display information sensed by the various sensors. Furthermore, the console display 102 may display an image of the surroundings of the vehicle captured by an image sensor, or may display an image of a distance to an obstacle present in the surroundings of the vehicle.

The head-up display 103 is virtually displayed behind a windshield 112 in front of the driver seat 108. The head-up display 103 can be used to display, for example, at least one of the safety-related information, the operation-related information, the life log, the health-related information, the authentication/identification-related information, or the entertainment-related information. Since the head-up display 103 is virtually arranged in front of the driver seat 108 in many cases, the head-up display 103 is suitable for displaying information directly related to an operation of the vehicle 100, such as a speed of the vehicle 100 and a remaining amount of fuel (battery).

The digital rear mirror 104 can also display a state of the occupant in the rear seat in addition to the rear side of the vehicle 100, and thus can be used to display the life log information, for example, by disposing the sensor to overlap with a back surface side of the digital rear mirror 104.

The steering wheel display 105 is arranged near the center of a steering wheel 113 of the vehicle 100. The steering wheel display 105 can be used to display, for example, at least one of the safety-related information, the operation-related information, the life log, the health-related information, the authentication/identification-related information, or the entertainment-related information. In particular, since the steering wheel display 105 is close to the driver's hand, the steering wheel display 105 is suitable for displaying the life log information such as the body temperature of the driver, or for displaying information regarding an operation of the AV device, air conditioning equipment, or the like.

The rear entertainment display 106 is attached to the back side of the driver seat 108 and the passenger seat 109, and is for the occupant in the rear seat to view. The rear entertainment display 106 can be used to display, for example, at least one of the safety-related information, the operation-related information, the life log, the health-related information, the authentication/identification-related information, or the entertainment-related information. In particular, since the rear entertainment display 106 is in front of the occupant in the rear seat, information related to the occupant in the rear seat is displayed. For example, information regarding an operation of the AV device or the air conditioning equipment may be displayed, or a result of measurement of the body temperature or the like of an occupant in the rear seat with a temperature sensor may be displayed.

The display device 1 according to the present disclosure can be applied to the center display 101, the console display 102, the head-up display 103, the digital rear mirror 104, the steering wheel display 105, and the rear entertainment display 106.

Second Application Example

The display device 1 according to the present disclosure can be applied not only to various displays used in vehicles but also to displays mounted on various electronic apparatuses.

Figure 31A:
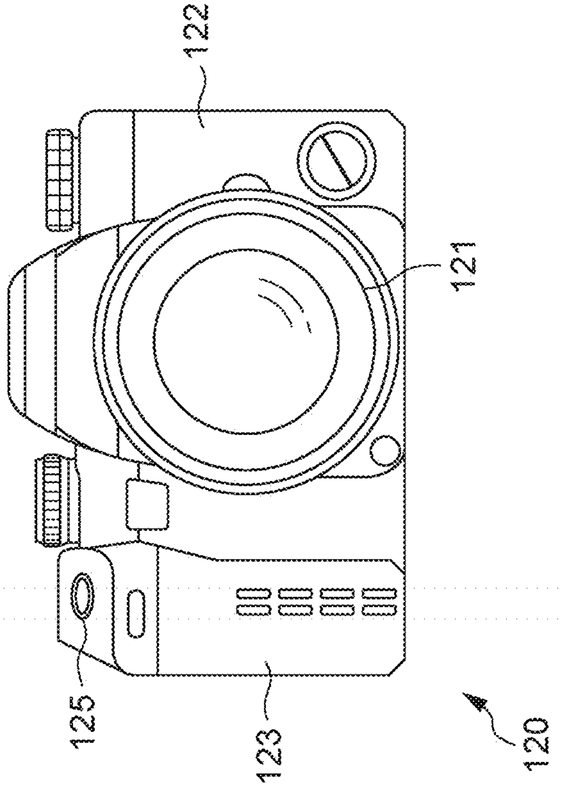
FIG. 31A is a front view of a digital camera that is a second application example of an electronic apparatus.

FIG. 31A is a front view of a digital camera 120 as a second application example of the electronic apparatus, and FIG. 31A is a rear view of the digital camera 120. The digital camera 120 in FIGS. 31A and 31B is an example of a single-lens reflex camera in which a lens 121 is replaceable, but the electronic apparatus is also applicable to a camera in which the lens 121 is not replaceable.

Figure 31B:
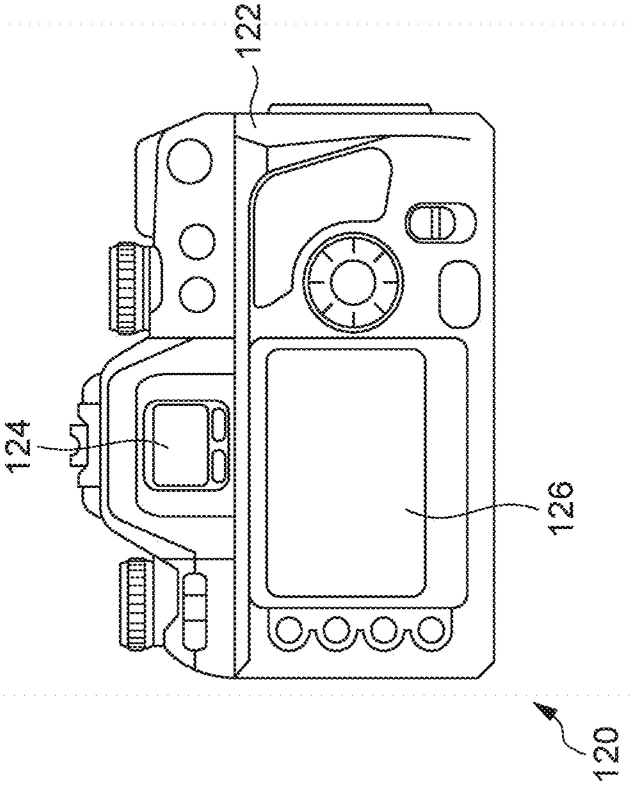
FIG. 31B is a rear view of a digital camera.

In the camera in FIGS. 31A and 31B, when a person who captures an image looks into an electronic viewfinder 124 to determine a composition while holding a grip 123 of a camera body 122, and presses a shutter 125 while adjusting focus, captured image data is stored in a memory in the camera. As illustrated in FIG. 31B, on a back side of the camera, a monitor screen 126 that displays the captured image data and the like and a live image and the like, and the electronic viewfinder 124 are provided. Furthermore, there is a case where a sub screen that displays setting information such as a shutter speed and an exposure value is provided on the upper surface of the camera.

By applying the display device 1 according to the present disclosure to the monitor screen 126, the electronic viewfinder 124, the sub screen, and the like used for the camera, it is possible to reduce the cost and improve the display quality.

Third Application Example

The display device 1 according to the present disclosure is also applicable to a head-mounted display (hereinafter, referred to as an HMD). The HMD can be used for virtual reality (VR), augmented reality (AR), mixed reality (MR), substitutional reality (SR), or the like.

Figure 32A:
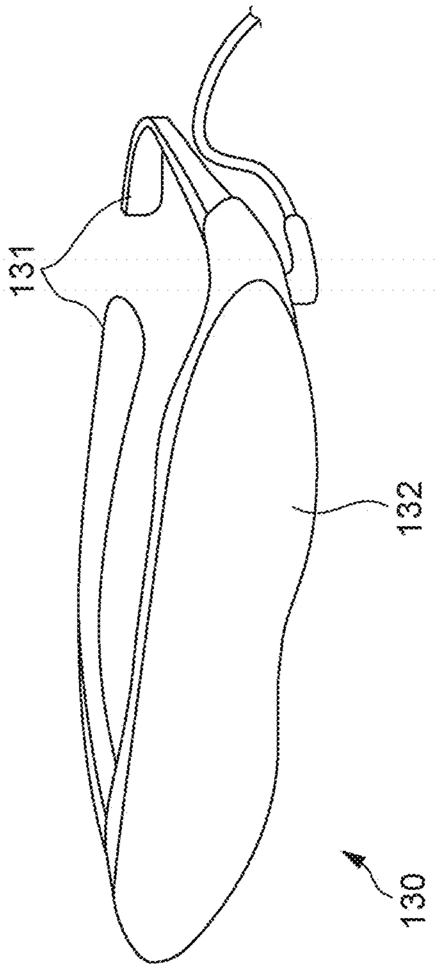
FIG. 32A is an external view of an HMD that is a third application example of an electronic apparatus.

FIG. 32A is an external view of an HMD 130 as a third application example of the electronic apparatus. The HMD 130 in FIG. 32A includes a mounting member 131 for attachment to cover human eyes. The mounting member 131 is, for example, hooked and fixed to human ears. A display device 132 is provided inside the HMD 130, and a wearer of the HMD 130 can visually recognize a stereoscopic image and the like with the display device 132. The HMD 130 includes, for example, a wireless communication function and an acceleration sensor, and can switch a stereoscopic image and the like displayed on the display device 132 in accordance with a posture, a gesture, and the like of the wearer. The display device 1 illustrated in FIG. 1 can be applied to the display device 132 in FIG. 32A.

Furthermore, a camera may be provided in the HMD 130 to capture an image around the wearer, and an image obtained by combining the image captured by the camera and an image generated by a computer may be displayed on the display device 132. For example, by arranging the camera to overlap with the back surface side of the display device 132 visually recognized by the wearer of the HMD 130, capturing an image of the surroundings of the eyes of the wearer with the camera, and displaying the captured image on another display provided on the outer surface of the HMD 130, a person around the wearer can obtain expression of the face and a movement of the eyes of the wearer in real time.

Figure 32B:
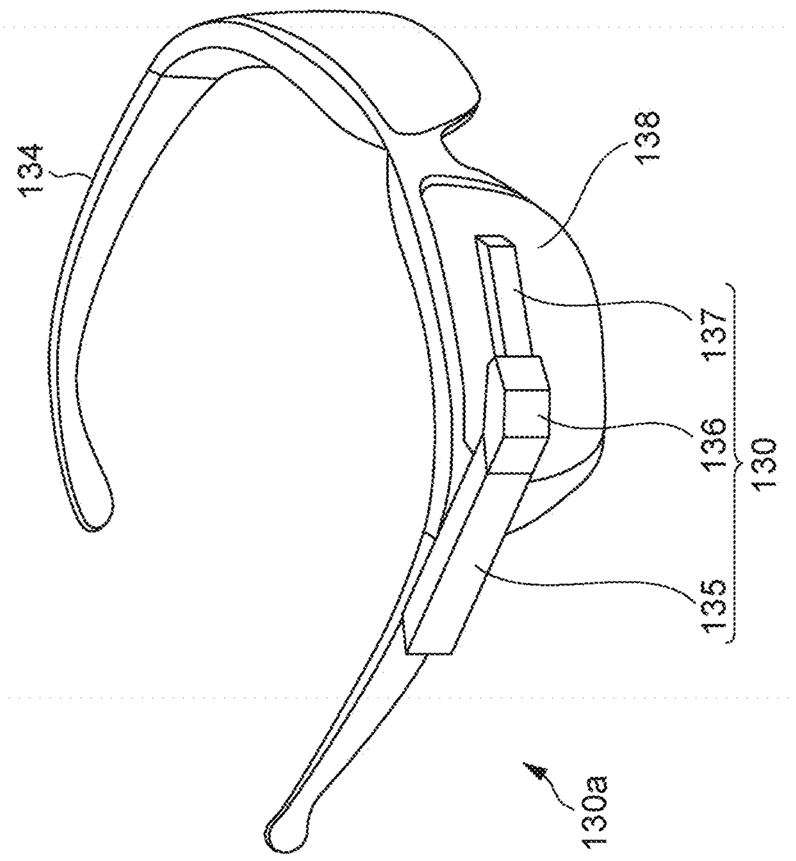
FIG. 32B is an external view of smart glasses.

Note that various types of the HMD 130 are conceivable. For example, as illustrated in FIG. 32B, the display device 1 according to the present disclosure can also be applied to smart glasses 130*a* that display various types of information on glasses 134. The smart glasses 130*a* in FIG. 32B includes a main body portion 135, an arm portion 136, and a lens barrel portion 137. The main body portion 135 is connected to the arm portion 136. The main body portion 135 is detachable from the glasses 134. The main body portion 135 incorporates a display unit and a control board for controlling the operation of the smart glasses 130*a*. The main body portion 135 and the lens barrel are connected to each other via the arm portion 136. The lens barrel portion 137 emits image light emitted from the main body portion 135 through the arm portion 136, to the lens 138 side of the glasses 134. This image light enters the human eyes through the lens 138. The wearer of the smart glasses 130*a* in FIG. 32B can visually recognize not only a surrounding situation but also various pieces of information emitted from the lens barrel portion 137 similarly to normal glasses.

Fourth Application Example

The display device 1 according to the present disclosure can also be applied to a television device (hereinafter referred to as a TV).

Figure 33:
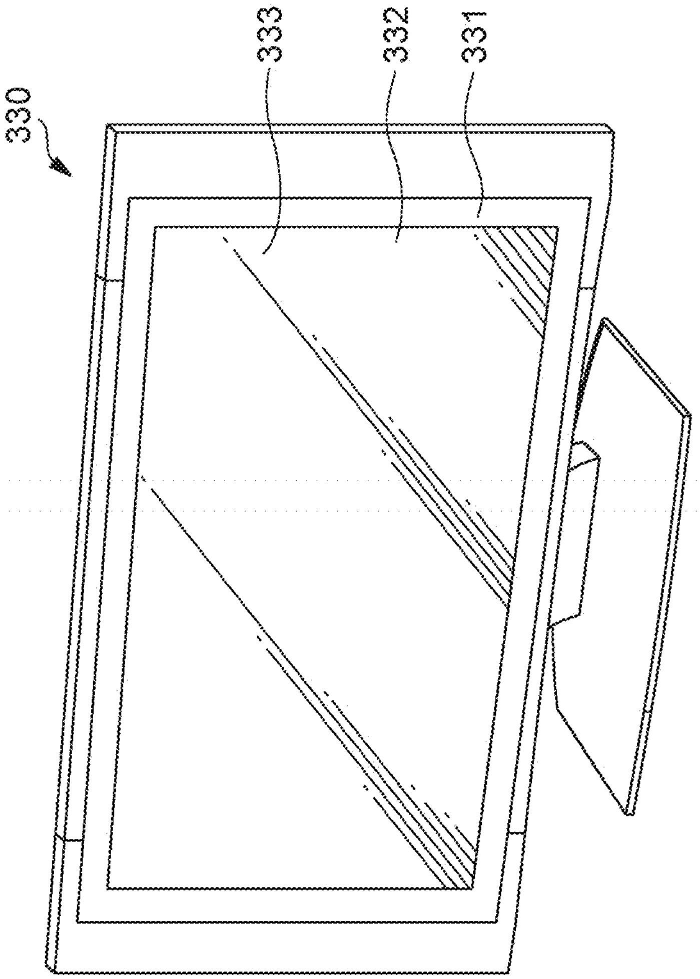
FIG. 33 is an external view of a TV that is a fourth application example of an electronic apparatus.

FIG. 33 is an external view of a TV 330 as a fourth application example of the electronic apparatus. The TV 330 includes, for example, an image display screen unit 331 including a front panel 332 and a filter glass 333. The display device 1 according to the present disclosure is applicable to the image display screen unit 331.

As described above, according to the display device 1 of the present disclosure, the TV 330 with low cost and excellent display quality can be realized.

Fifth Application Example

Figure 34:
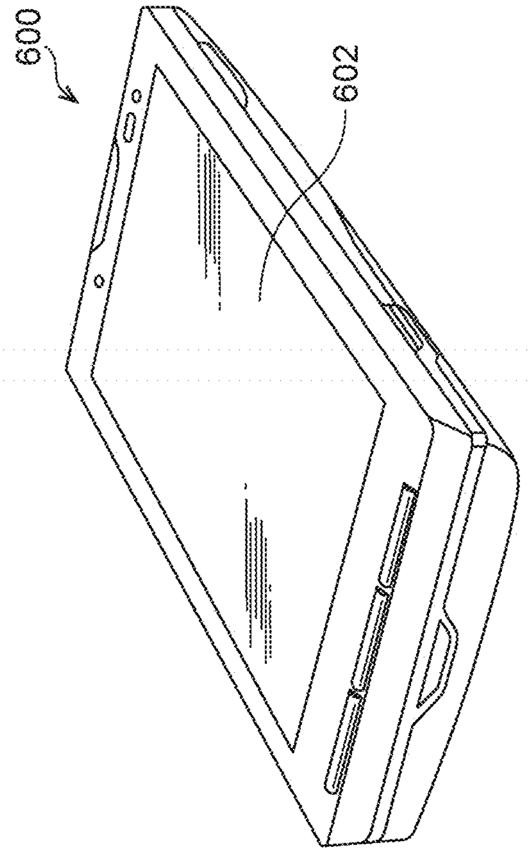
FIG. 34 is an external view of a smartphone that is a fifth application example of an electronic apparatus.

The display device 1 according to the present disclosure can also be applied to a smartphone and a mobile phone. FIG. 34 is an external view of a smartphone 600 as a fifth application example of the electronic apparatus. The smartphone 600 includes a display unit 602 that displays various types of information and an operation unit including a button or the like that receives a scan input by the user. The display device 1 according to the present disclosure is applicable to the above-described display unit 602.

Note that the present technology may have the following configurations.

(1)

A display device including:

a plurality of pixels;

a gradation voltage generation unit that generates a gradation voltage;

a reference voltage supply wiring at least partially extending in a pixel region in which the plurality of pixels is arranged, the reference voltage supply wiring supplying a reference voltage to the pixels; and a lead-out wiring electrically connected to the reference voltage supply wiring at a voltage lead-out position on the reference voltage supply wiring, in which the gradation voltage generation unit generates the gradation voltage on the basis of the reference voltage supplied from the lead-out wiring.

(2)

The display device according to (1), in which the plurality of pixels is arranged in the pixel region, the reference voltage supply wiring is supplied with the reference voltage from a reference voltage supply unit arranged at a position different from the pixel region, and the lead-out wiring supplies the gradation voltage generation unit with a voltage at the voltage lead-out position on the reference voltage supply wiring according to a position of the pixel with respect to the reference voltage supply unit.

(3)

The display device according to (1) or (2), in which the lead-out wiring is provided for each of a plurality of the voltage lead-out positions on the reference voltage supply wiring, and the gradation voltage generation unit is provided for each of a plurality of the lead-out wirings.

(4)

The display device according to (3), further including a drive unit that supplies a signal voltage corresponding to the gradation voltage to the plurality of pixels, in which a plurality of the gradation voltage generation units is arranged at a plurality of positions with respect to the drive unit according to a plurality of the voltage lead-out positions with respect to the reference voltage supply wiring.

(5)

The display device according to (3) or (4), in which one of two of the gradation voltage generation units supplies a first gradation voltage to the gradation voltage supply wiring from a first supply position on the gradation voltage supply wiring, another of the two of the gradation voltage generation units supplies a second gradation voltage to the gradation voltage supply wiring from a second supply position on the gradation voltage supply wiring, and a voltage of the gradation voltage supply wiring at a position between the first supply position and the second supply position has a voltage level between the first gradation voltage and the second gradation voltage.

(6)

The display device according to any one of (3) to (5), in which the plurality of pixels is arranged in the pixel region, the reference voltage supply wiring is supplied with the reference voltage from a reference voltage supply unit arranged at a position different from the pixel region, and the lead-out wiring includes:

a first lead-out wiring that supplies a voltage at the voltage lead-out position on the reference voltage supply wiring according to a position of a first pixel closest to the reference voltage supply unit to a first gradation voltage generation unit included in the gradation voltage generation unit; and a second lead-out wiring that supplies a voltage at the voltage lead-out position on the reference voltage supply wiring according to a position of a second pixel farthest from the reference voltage supply unit to a second gradation voltage generation unit included in the gradation voltage generation unit.

(7)

The display device according to (6), further including a drive unit that supplies a signal voltage corresponding to the gradation voltage to the plurality of pixels, in which the first gradation voltage generation unit and the second gradation voltage generation unit are disposed to sandwich the drive unit.

(8)

The display device according to (6) or (7), in which the lead-out wiring further includes a third lead-out wiring that supplies a voltage at the voltage lead-out position on the reference voltage supply wiring according to a position of a third pixel disposed between the first pixel and the second pixel to a third gradation voltage generation unit included in the gradation voltage generation unit.

(9)

The display device according to (8), in which the third gradation voltage generation unit is disposed between the first gradation voltage generation unit and the second gradation voltage generation unit.

(10)

The display device according to (1) or (2), in which the lead-out wiring supplies a voltage at one of the voltage lead-out positions on the reference voltage supply wiring to the gradation voltage generation unit.

(11)

The display device according to (10), in which the plurality of pixels is arranged in the pixel region, the reference voltage supply wiring is supplied with the reference voltage from a reference voltage supply unit arranged at a position different from the pixel region, and the lead-out wiring supplies the gradation voltage generation unit with a voltage at the voltage lead-out position on the reference voltage supply wiring according to a position of a second pixel farthest from the reference voltage supply unit.

(12)

The display device according to (10), in which the plurality of pixels is arranged in the pixel region, the reference voltage supply wiring is supplied with the reference voltage from a reference voltage supply unit arranged at a position different from the pixel region, and the lead-out wiring supplies the gradation voltage generation unit with a voltage at the voltage lead-out position on the reference voltage supply wiring according to a position of the pixel disposed between a first pixel closest to the reference voltage supply unit and a second pixel farthest from the reference voltage supply unit.

(13)

The display device according to any one of (1) to (12), in which the plurality of pixels is arranged in the pixel region, the reference voltage supply wiring is supplied with the reference voltage from a reference voltage supply unit arranged at a position different from the pixel region, and the pixel region and the reference voltage supply unit are arranged side by side in a supply direction of a signal voltage to the pixel.

(14)

The display device according to any one of (1) to (12), in which the plurality of pixels is arranged in the pixel region, the reference voltage supply wiring is supplied with the reference voltage from a reference voltage supply unit arranged at a position different from the pixel region, and the pixel region and the reference voltage supply unit are arranged side by side in a direction different from a supply direction of a signal voltage to the pixel.

(15)

The display device according to any one of (1) to (14), in which the reference voltage supply wiring includes:

a first reference voltage supply wiring arranged to cover a periphery of the plurality of pixels; and a second reference voltage supply wiring connected between the first reference voltage supply wiring and the pixel and having a wiring resistance higher than a wiring resistance of the first reference voltage supply wiring, and the lead-out wiring supplies a voltage at the voltage lead-out position on the first reference voltage supply wiring to the gradation voltage generation unit.

(16)

The display device according to any one of (1) to (15), in which the reference voltage is a power supply voltage on a high potential side supplied to the pixel.

(17)

The display device according to any one of (1) to (15), in which the reference voltage is a power supply voltage on a low potential side supplied to the pixel.

(18)

The display device according to any one of (1) to (17), in which the gradation voltage generation unit includes a plurality of resistance elements connected in series, and includes a ladder resistance circuit that outputs the gradation voltage from an end portion of each of the resistance elements on the basis of the reference voltage supplied from the lead-out wiring.

(19)

The display device according to any one of (1) to (17), in which the gradation voltage generation unit includes:

a ramp wave voltage generation unit that generates a ramp wave voltage whose voltage level changes with time on the basis of the reference voltage supplied from the lead-out wiring; and a timing control unit that generates the gradation voltage by controlling a timing of supplying the ramp wave voltage on the basis of luminance of the plurality of pixels.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions are possible without departing from the conceptual idea and spirit of the present disclosure derived from the matters defined in the claims and equivalents thereof.

REFERENCE SIGNS LIST

1 Display device
10 Pixel
10*n* First pixel
10*f* Second pixel
20 Pixel unit
21 Scanning line
22 Signal line
40 Gradation voltage generation circuit
40A First gradation voltage generation circuit
40B Second gradation voltage generation circuit
40C Third gradation voltage generation circuit
41 Ladder resistance circuit
411 Gradation voltage supply wiring
47 Ramp wiring
50 Drive unit
52 DAC
60 IO pad
61 Power supply wiring
611 Outer peripheral power supply wiring
70 Lead-out wiring
70A First lead-out wiring
70B Second lead-out wiring
ELVDD Voltage
ELVSS Voltage
Pn Position
Pf Position
Pc Position
Pv Voltage lead-out position
VG0 to VG255 Gradation voltage
VG0A to VG255A First gradation voltage
VG0B to VG255B Second gradation voltage
VG0C to VG255C Third gradation voltage

The invention claimed is:

1. A display device, comprising:
a plurality of pixels;
a gradation voltage generation unit configured to generate a gradation voltage;
a reference voltage supply wiring at least partially extending in a pixel region in which the plurality of pixels is arranged, the reference voltage supply wiring is configured to supply a reference voltage to the plurality of pixels; and
a lead-out wiring electrically connected to the reference voltage supply wiring at a voltage lead-out position on the reference voltage supply wiring, wherein
the gradation voltage generation unit is further configured to generate the gradation voltage based on the reference voltage supplied from the lead-out wiring.

2. The display device according to claim 1, wherein
the plurality of pixels is arranged in the pixel region,
the reference voltage supply wiring is supplied with the reference voltage from a reference voltage supply unit arranged at a position different from the pixel region,
the lead-out wiring is configured to supply the gradation voltage generation unit with a voltage at the voltage lead-out position on the reference voltage supply wiring according to a position of a pixel with respect to the reference voltage supply unit, and
the plurality of pixels includes the pixel.

3. The display device according to claim 1, wherein
the lead-out wiring is provided for each of a plurality of voltage lead-out positions on the reference voltage supply wiring,
the plurality of voltage lead-out positions includes the voltage lead-out position,
the gradation voltage generation unit is provided for each of a plurality of lead-out wirings, and
the plurality of lead-out wirings includes the lead-out wiring.

4. The display device according to claim 3, further comprising a drive unit configured to supply a signal voltage corresponding to the gradation voltage to the plurality of pixels, wherein
a plurality of gradation voltage generation units is arranged at a plurality of positions with respect to the drive unit according to the plurality of voltage lead-out positions with respect to the reference voltage supply wiring, and
the plurality of gradation voltage generation units includes the gradation voltage generation unit.

5. The display device according to claim 3, wherein
one of two of gradation voltage generation unit is configured to supply a first gradation voltage to a gradation voltage supply wiring from a first supply position on the gradation voltage supply wiring,
another of the two of the gradation voltage generation units is configured to supply a second gradation voltage to the gradation voltage supply wiring from a second supply position on the gradation voltage supply wiring,
a voltage of the gradation voltage supply wiring at a position between the first supply position and the second supply position has a voltage level between the first gradation voltage and the second gradation voltage, and
the two of the gradation voltage generation units includes the gradation voltage generation unit.

6. The display device according to claim 3, wherein
the plurality of pixels is arranged in the pixel region,
the reference voltage supply wiring is supplied with the reference voltage from a reference voltage supply unit arranged at a position different from the pixel region,
the lead-out wiring includes:
a first lead-out wiring configured to supply a voltage at the voltage lead-out position on the reference voltage supply wiring according to a position of a first pixel closest to the reference voltage supply unit to a first gradation voltage generation unit included in the gradation voltage generation unit; and
a second lead-out wiring configured to supply a voltage at the voltage lead-out position on the reference voltage supply wiring according to a position of a second pixel farthest from the reference voltage supply unit to a second gradation voltage generation unit included in the gradation voltage generation unit, and the plurality of pixels includes the first pixel and the second pixel.

7. The display device according to claim 6, further comprising a drive unit configured to supply a signal voltage corresponding to the gradation voltage to the plurality of pixels, wherein the first gradation voltage generation unit and the second gradation voltage generation unit are disposed to sandwich the drive unit.

8. The display device according to claim 6, wherein the lead-out wiring further includes a third lead-out wiring configured to supply a voltage at the voltage lead-out position on the reference voltage supply wiring according to a position of a pixel disposed between the first pixel and the second pixel to a third gradation voltage generation unit included in the gradation voltage generation unit, and the plurality of pixels includes the pixel.

9. The display device according to claim 8, wherein the third gradation voltage generation unit is disposed between the first gradation voltage generation unit and the second gradation voltage generation unit.

10. The display device according to claim 1, wherein the lead-out wiring is configured to supply a voltage at one of a plurality of voltage lead-out positions on the reference voltage supply wiring to the gradation voltage generation unit, and the plurality of voltage lead-out positions includes the voltage lead-out position.

11. The display device according to claim 10, wherein the plurality of pixels is arranged in the pixel region, the reference voltage supply wiring is supplied with the reference voltage from a reference voltage supply unit arranged at a position different from the pixel region, the lead-out wiring is configured to supply the gradation voltage generation unit with a voltage at the voltage lead-out position on the reference voltage supply wiring according to a position of a second pixel farthest from the reference voltage supply unit, and the plurality of pixels includes the second pixel.

12. The display device according to claim 10, wherein the plurality of pixels is arranged in the pixel region, the reference voltage supply wiring is supplied with the reference voltage from a reference voltage supply unit arranged at a position different from the pixel region, the lead-out wiring is configured to supply the gradation voltage generation unit with a voltage at the voltage lead-out position on the reference voltage supply wiring according to a position of a pixel disposed between a first pixel closest to the reference voltage supply unit and a second pixel farthest from the reference voltage supply unit, and the plurality of pixels includes the pixel, the first pixel, and the second pixel.

13. The display device according to claim 1, wherein the plurality of pixels is arranged in the pixel region, the reference voltage supply wiring is supplied with the reference voltage from a reference voltage supply unit arranged at a position different from the pixel region, and the pixel region and the reference voltage supply unit are arranged side by side in a supply direction of a signal voltage to a pixel of the plurality of pixels.

14. The display device according to claim 1, wherein the plurality of pixels is arranged in the pixel region, the reference voltage supply wiring is supplied with the reference voltage from a reference voltage supply unit arranged at a position different from the pixel region, and the pixel region and the reference voltage supply unit are arranged side by side in a direction different from a supply direction of a signal voltage to a pixel of the plurality of pixels.

15. The display device according to claim 1, wherein the reference voltage supply wiring includes:

a first reference voltage supply wiring arranged to cover a periphery of the plurality of pixels; and a second reference voltage supply wiring connected between the first reference voltage supply wiring and a pixel and having a wiring resistance higher than a wiring resistance of the first reference voltage supply wiring, the lead-out wiring is configured to supply a voltage at the voltage lead-out position on the first reference voltage supply wiring to the gradation voltage generation unit, and the plurality of pixels includes the pixel.

16. The display device according to claim 1, wherein the reference voltage is a power supply voltage on a high potential side supplied to a pixel of the plurality of pixels.

17. The display device according to claim 1, wherein the reference voltage is a power supply voltage on a low potential side supplied to a pixel of the plurality of pixels.

18. The display device according to claim 1, wherein the gradation voltage generation unit includes a plurality of resistance elements connected in series, and includes a ladder resistance circuit configured to output the gradation voltage from an end portion of each of the plurality of resistance elements based on the reference voltage supplied from the lead-out wiring.

19. The display device according to claim 1, wherein the gradation voltage generation unit includes:

a ramp wave voltage generation unit configured to generate a ramp wave voltage whose voltage level changes with time based on the reference voltage supplied from the lead-out wiring; and a timing control unit configured to generate the gradation voltage by controlling a timing of supplying the ramp wave voltage based on luminance of the plurality of pixels.

* * * * *